(12) United States Patent
Ha et al.

(10) Patent No.: US 11,586,042 B2
(45) Date of Patent: Feb. 21, 2023

(54) OPTICAL DEVICE

(71) Applicant: Samsung Display Co., Ltd., Yongin-si (KR)

(72) Inventors: Ju Hwa Ha, Seoul (KR); Jae Joong Kwon, Suwon-si (KR); Jeong Woo Park, Yongin-si (KR); Su Bin Jung, Incheon (KR); Hyun Jin Cho, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 138 days.

(21) Appl. No.: 16/542,089

(22) Filed: Aug. 15, 2019

(65) Prior Publication Data

US 2020/0057306 A1  Feb. 20, 2020

(30) Foreign Application Priority Data

Aug. 20, 2018  (KR) .................. 10-2018-0096955

(51) Int. Cl.
  *G02B 27/01*  (2006.01)
  *G02B 3/00*  (2006.01)

(52) U.S. Cl.
  CPC ....... *G02B 27/0172* (2013.01); *G02B 3/0056* (2013.01); *G02B 2027/0125* (2013.01); *G02B 2027/0178* (2013.01)

(58) Field of Classification Search
  CPC .............. G02B 27/0172; G02B 3/0056; G02B 2027/0178; G02B 2027/0125; G02B 2027/0123; G02B 27/0075; G02B 3/0006; G02B 3/0012; G02B 3/0037; G02B 3/0075; G02B 3/02; G02B 3/10; G02B 3/12; G02B 3/14; G02B 27/095; G02B 27/0955; G02B 27/0961; G02B 27/0966; G02B 27/10; G02B 27/12; G02B 27/123
  USPC ......................................... 359/619
  See application file for complete search history.

(56) References Cited

U.S. PATENT DOCUMENTS

| | | |
|---|---|---|
| 9,237,338 B1 | 1/2016 | Maguire, Jr. |
| 9,419,065 B2 | 8/2016 | Degner et al. |
| 9,761,051 B2 | 9/2017 | Bromer |
| 10,386,563 B2 | 8/2019 | Ishii et al. |
| 11,409,106 B2 | 8/2022 | Jung et al. |

(Continued)

FOREIGN PATENT DOCUMENTS

| | | |
|---|---|---|
| CN | 106483658 A | 3/2017 |
| CN | 108254919 A | 7/2018 |

(Continued)

OTHER PUBLICATIONS

Office Action issued in U.S. Appl. No. 16/514,885 by the USPTO, dated Aug. 5, 2019, 29 pages.

(Continued)

*Primary Examiner* — Thomas K Pham
*Assistant Examiner* — Henry A Duong
(74) *Attorney, Agent, or Firm* — Lewis Roca Rothgerber Christie LLP

(57) ABSTRACT

An optical device includes: a lens including a first reflector; a display device at a first side surface of the lens and including a plurality of subpixels; and a lens array between the lens and the display device and including a plurality of lenses configured to condense light from the subpixels onto the first reflector.

20 Claims, 20 Drawing Sheets

(56) References Cited

U.S. PATENT DOCUMENTS

| | | |
|---|---|---|
| 2010/0149073 A1 | 6/2010 | Chaum et al. |
| 2011/0019250 A1* | 1/2011 | Aiki .................. G02B 5/32 |
| | | 359/861 |
| 2011/0063580 A1 | 3/2011 | Amano et al. |
| 2011/0249087 A1 | 10/2011 | Tsang et al. |
| 2012/0068368 A1* | 3/2012 | Suenaga ............ G02B 5/1895 |
| | | 264/1.7 |
| 2017/0064291 A1 | 3/2017 | Do et al. |
| 2017/0255020 A1* | 9/2017 | Tam .................. G06F 3/013 |
| 2017/0308160 A1 | 10/2017 | Yoon |
| 2018/0063520 A1 | 3/2018 | Chung et al. |
| 2018/0292652 A1 | 10/2018 | Ha |
| 2018/0372940 A1* | 12/2018 | Ishii .................. G02B 27/283 |
| 2021/0211641 A1 | 7/2021 | Do et al. |

FOREIGN PATENT DOCUMENTS

| | | |
|---|---|---|
| KR | 10-1660519 B1 | 9/2016 |
| KR | 10-1830364 B1 | 2/2018 |
| KR | 10-2018-0027813 A | 3/2018 |
| KR | 10-2018-0028339 A | 3/2018 |
| WO | WO 2018/013307 A1 | 1/2018 |

OTHER PUBLICATIONS

U.S. Final Office Action dated Jan. 27, 2021, issued in U.S. Appl. No. 16/514,885 (30 pages).

* cited by examiner

OPTICAL DEVICE

CROSS-REFERENCE TO RELATED APPLICATION

This application claims priority to and the benefit of Korean Patent Application No. 10-2018-0096955, filed on Aug. 20, 2018, in the Korean Intellectual Property Office, the disclosure of which is incorporated herein by reference in its entirety.

BACKGROUND

1. Field

The present disclosure relates to an optical device.

2. Description of the Related Art

Augmented reality refers to a technology that displays a single image by superimposing a virtual image on a real image seen by a user's eyes. The virtual image may be an image in the form of text or graphics, and the real image may be information about an actual object observed in the field of view (FOV) of a device.

The augmented reality may be implemented using a head mounted display (HMD), a head-up display (HUD), or the like. When implemented using an HMD, the augmented reality may be provided in the form of eyeglasses that cannot only be easily carried but also easily worn or taken off by a user. In this case, a display device that provides a virtual image for realizing the augmented reality is implemented using a micro display such as an organic light emitting diode on silicon (OLEDoS) or a liquid crystal on silicon (LCOS).

Recently, there has been a demand (or desire) to expand an area of a display device visible to a user's eyes, e.g., the FOV of the user. In this case, a plurality of micro displays are required.

SUMMARY

Aspects of embodiments of the present disclosure provide an optical device which can expand an area of a display device visible to a user's eye, e.g., a field of view (FOV) of the user, while using one display.

However, aspects of embodiments of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of embodiments of the present disclosure, an optical device includes: a lens including a first reflector; a display device at a first side surface of the lens and including a plurality of subpixels; and a lens array between the lens and the display device and including a plurality of lenses configured to condense light from the subpixels onto the first reflector.

The first reflector may be configured to reflect an image displayed on the display device to a first surface of the lens.

A pitch of the lenses in a first direction may be smaller than a pitch of the subpixels in the first direction.

The lenses may be arranged to correspond one-to-one to the subpixels.

The lens may further include a second reflector, a third reflector, and a fourth reflector, and the display device may include: a first display area at a first side surface of the lens; a second display area at a second side surface of the lens and extending from an end of the first display area; a third display area at a third side surface of the lens and extending from an end of the second display area; and a fourth display area at a fourth side surface of the lens and extending from an end of the third display area.

The first reflector may be configured to reflect a first image displayed on the first display area to a first surface of the lens, the second reflector may be configured to reflect a second image displayed on the second display area to the first surface of the lens, the third reflector may be configured to reflect a third image displayed on the third display area to the first surface of the lens, and the fourth reflector may be configured to reflect a fourth image displayed on the fourth display area to the first surface of the lens.

The display device may surround side surfaces of the lens.

The pitch of the lenses along a first direction may be smaller than a pitch of a plurality of pixels in the first direction, and may be greater than a pitch of the subpixels along the first direction. Each of the pixels may include N subpixels, where N is an integer of 2 or more.

The lenses may be arranged to correspond one-to-one to the pixels.

The subpixels may include first subpixels configured to display a first view image, second subpixels configured to display a second view image, and third subpixels configured to display a third view image.

The first reflector may include: a (1-1)-th reflector; a (1-2)-th reflector; and a (1-3)-th reflector, the subpixels may include: a first subpixel; a second subpixel; and a third subpixel, and the lenses may be configured to provide light of the first subpixels to the (1-1)-th reflector, light of the second subpixels to the (1-2)-th reflector and light of the third subpixels to the (1-3)-th reflector.

The (1-1)-th reflector may be configured to reflect the light of the first subpixels to a first surface of the lens, the (1-2)-th reflector may be configured to reflect the light of the second subpixels to the first surface of the lens, and the (1-3)-th reflector may be configured to reflect the light of the third subpixels to the first surface of the lens.

The display device may be at the first side surface of the lens and a second side surface of the lens, and the lens may further include: a (2-1)-th reflector configured to reflect the light of the first subpixels at the second side surface to a first surface of the lens; a (2-2)-th reflector configured to reflect the light of the second subpixels at the second side surface to the first surface of the lens; and a (2-3)-th reflector configured to reflect the light of the third subpixels at the second side surface to the first surface of the lens.

The display device may be at the third side surface of the lens, and the lens may include: a (3-1)-th reflector configured to reflect the light of the first subpixels at the third side surface to the first surface of the lens; a (3-2)-th reflector configured to reflect the light of the second subpixels at the third side surface to the first surface of the lens; and a (3-3)-th reflector configured to reflect the light of the third subpixels at the third side surface to the first surface of the lens.

The display device may be at the fourth side surface of the lens, and the lens may include: a (4-1)-th reflector configured to reflect the light of the first subpixels at the fourth side surface to the first surface of the lens; a (4-2)-th reflector configured to reflect the light of the second subpixels at the fourth side surface to the first surface of the lens; and a (4-3)-th reflector configured to reflect the light of the third subpixels at the fourth side surface to the first surface of the lens.

A first side of the lens may be thinner than a second side of the lens.

A thickness of the lens may be reduced from the first side of the lens toward the second side of the lens.

The lens may further include a third side surface facing the first side surface, and the third side surface may be smaller than the first side surface.

The first surface may be inclined with respect to a height direction of the lens.

The optical device may further include a resin at the first surface of the lens and having a higher refractive index than the lens.

A first side of the resin may be thicker than a second side of the resin.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
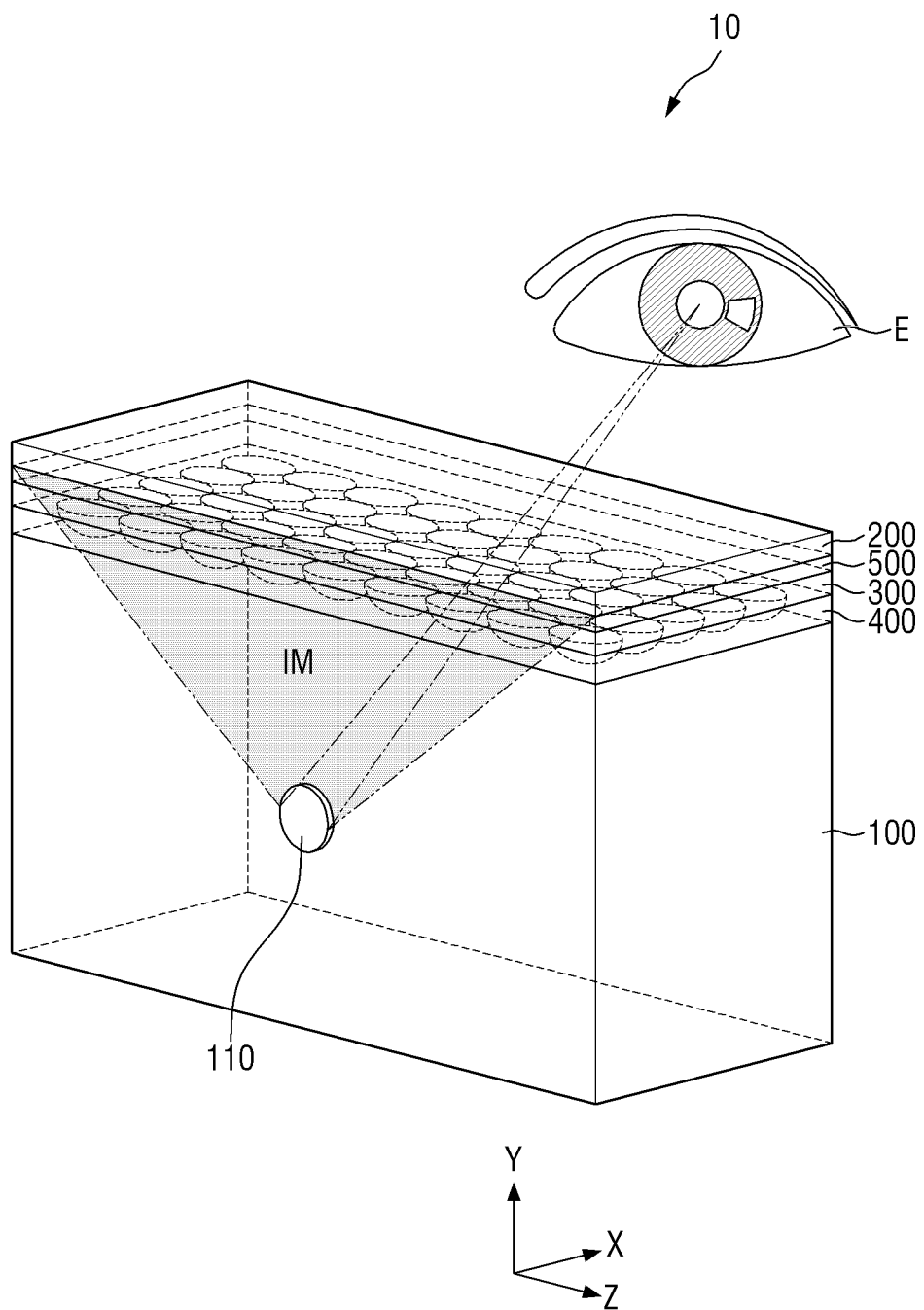
FIG. 1 is a perspective view of an optical device according to an embodiment.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Accordingly, processes, elements, and techniques that are not necessary to those having ordinary skill in the art for a complete understanding of the aspects and features of the present invention may not be described. Unless otherwise noted, like reference numbers indicate like components throughout the attached drawings and the written description, and thus, descriptions thereof may not be repeated. In the attached figures, the relative sizes and thicknesses of layers, elements, and regions may be exaggerated for clarity.

It will be understood that, although the terms "first," "second," "third," etc., may be used herein to describe various elements, components, regions, layers, and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "lower," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as being "lower" relative to other elements or features would then be oriented as "upper" relative to the other elements or features. Thus, the example terms "lower" and "upper" can encompass both an orientation of above and below. The device may be otherwise oriented (e.g., rotated 90 degrees or at other orientations) and the spatially relative descriptors used herein should be interpreted accordingly.

It will also be understood that when a layer is referred to as being "on" or "connected to" another layer, element, or substrate, it can be directly on or directly connected to the other layer, element, or substrate, or one or more intervening layers or elements may also be present. In addition, it will be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." In addition, the use of alternative language, such as "or," when describing embodiments of the present invention, refers to "one or more embodiments of the present invention" for each corresponding item listed. As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, embodiments of the present invention will be described with reference to the attached drawings.

Figure 2:
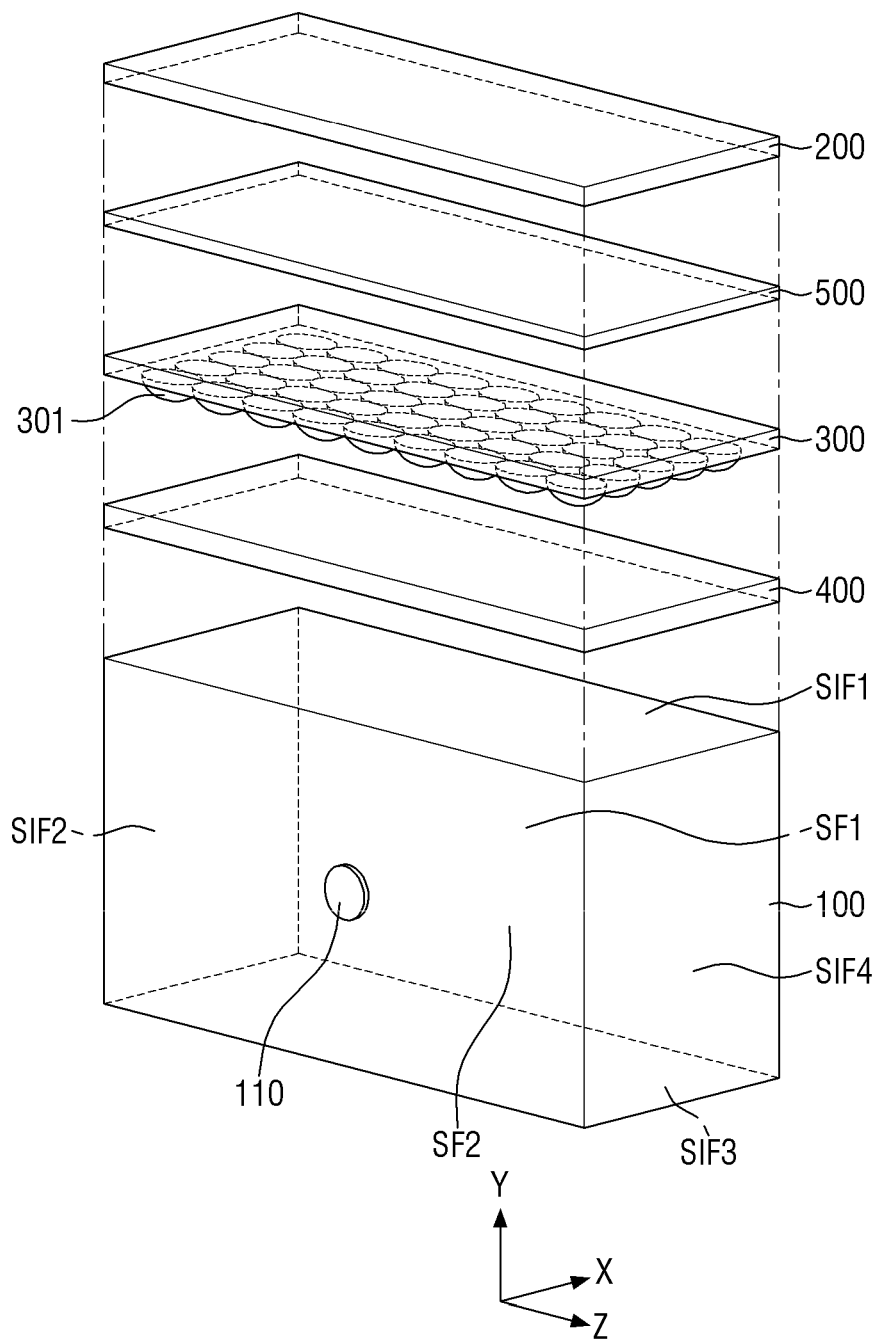
FIG. 2 is an exploded perspective view of the optical device of FIG. 1.

FIG. 1 is a perspective view of an optical device 10 according to an embodiment. FIG. 2 is an exploded perspective view of the optical device 10 of FIG. 1.

Referring to FIGS. 1 and 2, the optical device 10 according to an embodiment includes a lens 100, a display device 200, a lens array (e.g., a condenser lens array) 300, a first adhesive layer 400, and a second adhesive layer 500.

The lens 100 may be formed to be transparent or translucent, for example, by using glass or plastic. Thus, a user can see a real image through the lens 100. The lens 100 may have a refractive power (e.g., a predetermined refractive power) in consideration of or according to the eyesight of the user.

As illustrated in FIG. 2, the lens 100 may be formed in the shape of a hexahedron having quadrilateral first and second surfaces SF1 and SF2 and four side surfaces SIF1, SIF2, SIF3, SIF4. However, the shape of the lens 100 is not limited to the hexahedron, and the lens 100 may also be formed in various other suitable shapes. For example, the lens 100 may also be formed in the shape of a polyhedron having polygonal upper and lower surfaces and a plurality of side surfaces, a circular cylinder, an elliptical cylinder, a semicircular cylinder, a semi-elliptical cylinder, a distorted circular cylinder, or a distorted elliptical cylinder. The distorted circular cylinder and the distorted elliptical cylinder refer to a circular cylinder and a semicircular cylinder having a non-uniform diameter.

The lens 100 may include a first reflector (or first reflective member) 110. The first reflector 110 may also be referred to as a pin mirror. The first reflector 110 may be made of a metal material having high reflectance, such as silver (Ag) or rhodium (Rh).

Figure 3:
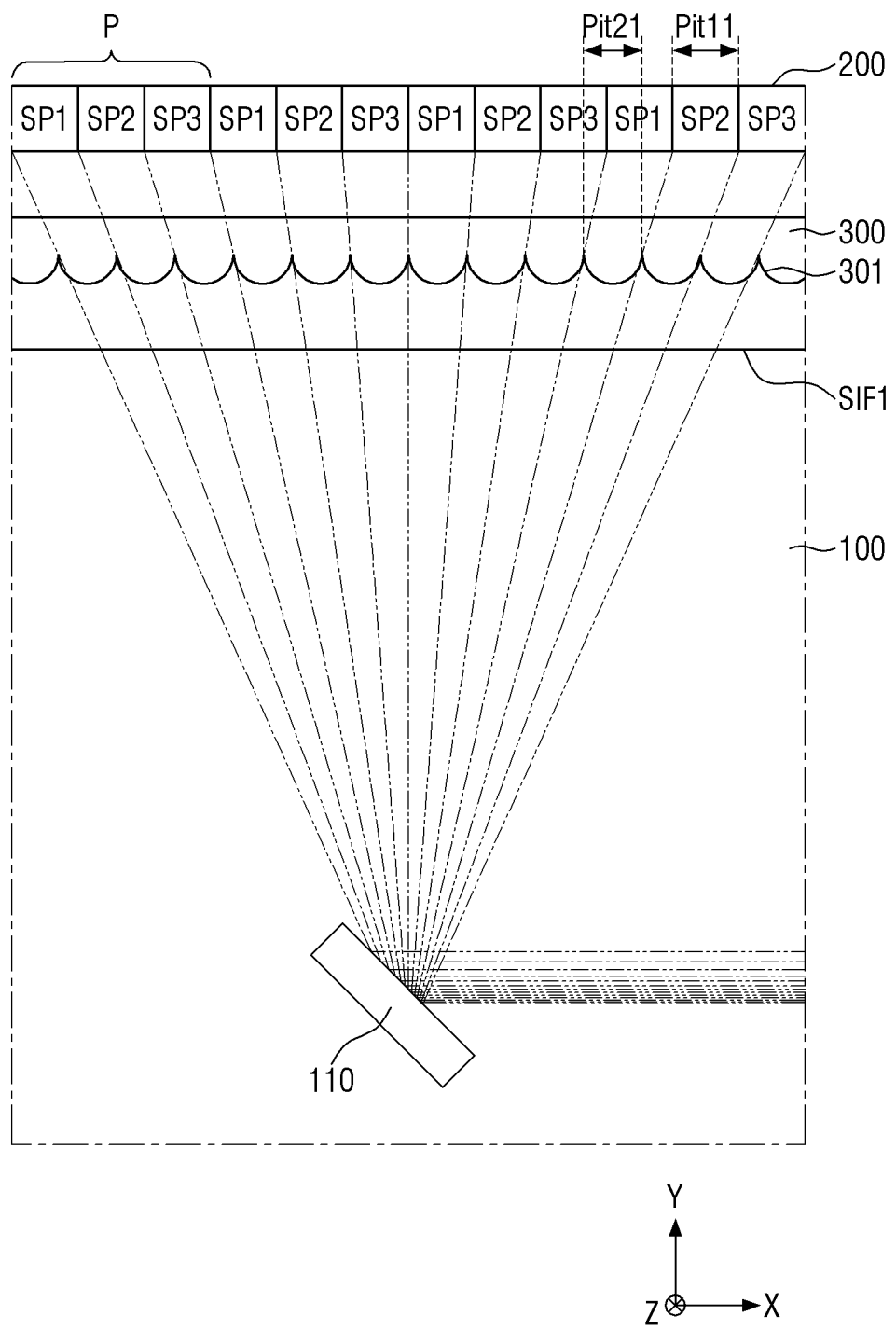
FIG. 3 is an example of subpixels of a display device, condenser lenses of a lens array, and a reflector of the optical device of FIG. 1 when viewed from an X-axis direction.

The first reflector 110 may be at (or disposed at) a center of the lens 100, as illustrated in FIGS. 1 and 2. The first reflector 110 reflects an image IM of the display device 200 that is condensed by the condenser lens array 300 to the first surface SF1 of the lens 100. The first surface SF1 of the lens 100 indicates (or corresponds to) a side surface of the lens 100. In some embodiments, the first reflector 110 may be inclined in a direction (−X-axis direction) opposite to a third direction (X-axis direction) with respect to a second direction (Y-axis direction) as illustrated in FIG. 3 (e.g., the first reflector 110 may be inclined when viewed from a first direction (Z-axis direction)). An inclined angle of the first reflector 110 may be predetermined (e.g., determined experimentally in advance by a person skilled in the art) such that the image IM of the display device 200 is reflected from the first reflector 110 to the user's eye E placed at (e.g., near or adjacent to or on) the first surface SF1 of the lens 100. In the following description, the first direction (Z-axis direction) indicates a width direction of the lens 100, the second direction (Y-axis direction) indicates a height direction of the lens 100, and a third direction (X-axis direction) indicates a thickness direction of the lens 100, as illustrated in FIGS. 1 and 2.

According to embodiments, as illustrated in FIGS. 1 and 2, the first reflector 110 may reflect the image IM of the display device 200 condensed by the condenser lens array 300 to the first surface SF1 of the lens 100, thereby providing the image IM to the user's eye E. According to embodiments, because the image IM displayed on the display device 200 is reflected by the first reflector 110, the depth of field is increased.

In addition, the first reflector 110 causes the image IM of the display device 200 condensed by the condenser lens array 300 to be focused at one point on the retina of the user's eye E. Therefore, even when (or if) the user focuses on a real image through the lens 100, he or she can clearly see a virtual image displayed on the display device 200. For example, even when (or if) the user does not shift the focus on the real image, he or she can clearly see the virtual image displayed on the display device 200.

The first reflector 110 may be smaller than a pupil. For example, the first reflector 110 may have a diameter of about 4 mm or less. Because the first reflector 110 is very small, it is difficult for the user to recognize the first reflector 110 when the user focuses on a real image. However, as the size of the first reflector 110 decreases, the luminance of a virtual image provided to the user's eye E also decreases. Therefore, the size of the first reflector 110 may be determined or set in consideration of (or according to) the luminance of the virtual image. Although the first reflector 110 is shown having a circular cross section in FIGS. 1 and 2, it may have any suitably shaped cross-section, such as an elliptical or polygonal cross section.

The display device 200 displays a virtual image for realizing augmented reality. The display device 200 may be at (e.g., on or disposed on) the first side surface SIF1 of the lens 100.

Figure 4:
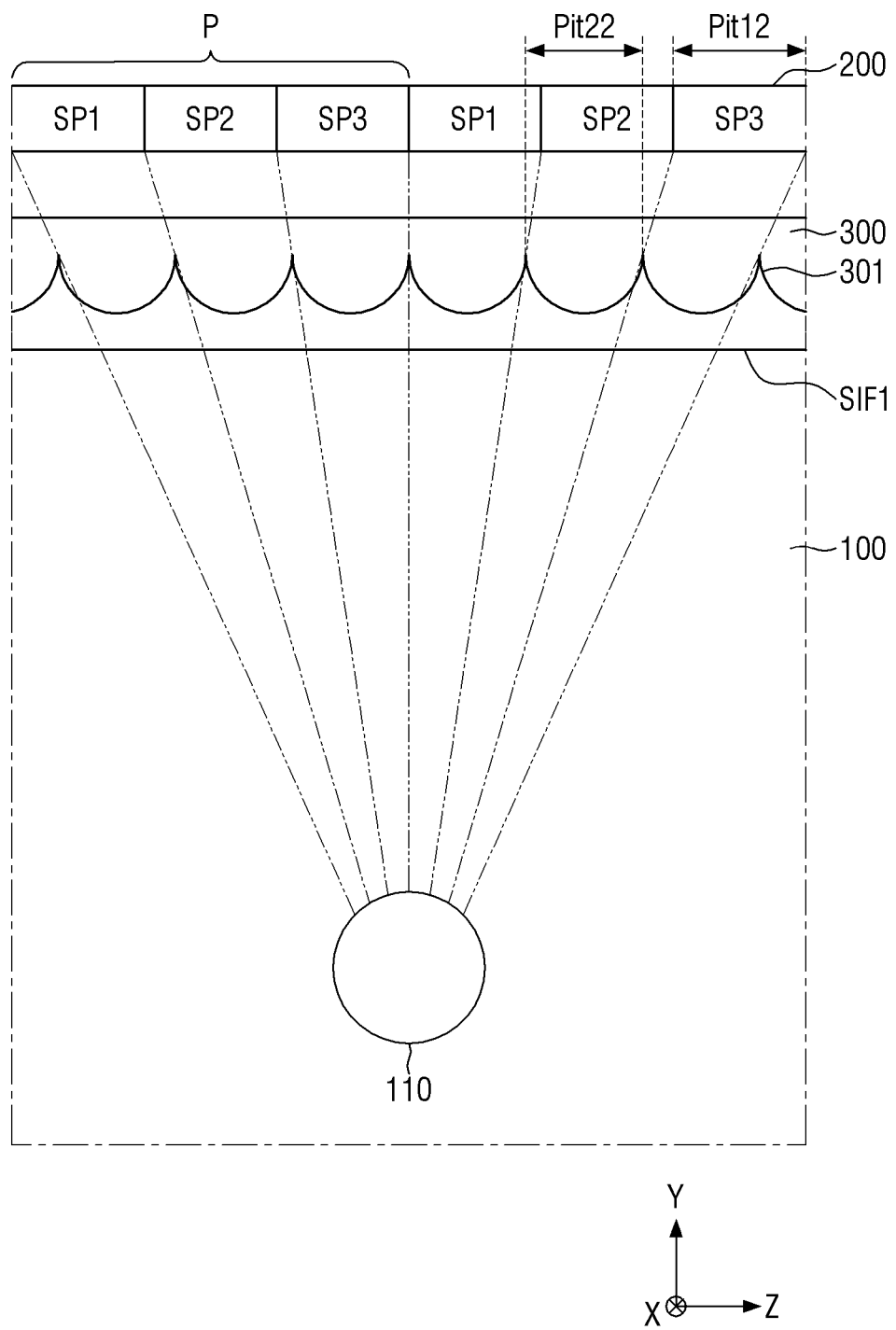
FIG. 4 is an example of the subpixels of the display device, the condenser lenses of the lens array, and the reflector of the optical device of FIG. 1 when viewed from a Z-axis direction.

The display device 200 may include pixels P to display a virtual image as illustrated in FIGS. 3 and 4. Each of the pixels P may include N subpixels (where N is an integer of 2 or more). For example, each of the pixels P may include a first subpixel SP1, a second subpixel SP2, and a third subpixel SP3. The first subpixel SP1 is a subpixel for displaying a first color, the second subpixel SP2 is a subpixel for displaying a second color, and the third subpixel SP3 is a subpixel for displaying a third color. In FIGS. 3 and 4, each of the pixels P includes three subpixels, e.g., the first through third subpixels SP1, SP2, and SP3. However, embodiments of the present disclosure are not limited thereto or thereby. For example, each of the pixels P may include subpixels for combining at least two or more of red, green, blue, yellow, magenta, cyan, and white. In addition, the subpixels of each of the pixels P may be arranged in a striped, rectangular, or diamond PENTILE® (PENTILE® is a registered trademark of Samsung Display Co., Ltd.) structure, for example, depending on the number of the subpixels.

The display device 200 can be bent due to its flexibility. For example, the display device 200 may be an organic light emitting display. The display device 200 is described in further detail below with reference to FIG. 14.

The condenser lens array 300 may be disposed between the lens 100 and the display device 200. The condenser lens array 300 may include a plurality of lenses (e.g., condenser lenses) 301. Using the condenser lenses 301, the condenser lens array 300 may condense light of the first through third subpixels SP1, SP2, SP3 of the display device 200 onto the first reflector 110.

The condenser lenses 301 may be formed as convex lenses that bulge toward the lens 100 to condense light of the first through third subpixels SP1, SP2, SP3 of the display device 200 onto the first reflector 110. Alternatively, the condenser lenses 301 may be formed as Fresnel lenses to reduce the thickness of the condenser lens array 300.

The condenser lenses 301 may be arranged to correspond one-to-one to the first through third subpixels SP1, SP2, SP3 as illustrated in FIGS. 3 and 4. Accordingly, the number of the condenser lenses 301 may be substantially equal to the number of subpixels (i.e., the number of first through third subpixels SP1, SP2, SP3).

In order for the condenser lenses 301 to condense light of the first through third subpixels SP1, SP2, SP3 of the display device 200 onto the first reflector 110 in (or disposed in) the lens 100, a pitch Pit11 of the first through third subpixels SP1, SP2, SP3 along the third direction (X-axis direction) may be greater than a pitch Pit21 of the condenser lenses 301 along the third direction (X-axis direction) as illustrated in FIG. 3, and a pitch Pit12 of the first through third subpixels SP1, SP2, SP3 along the first direction (Z-axis direction) may be greater than a pitch Pit22 of the condenser lenses 301 along the first direction (Z-axis direction) as illustrated in FIG. 4.

When the pitch Pit11 of the first through third subpixels SP1, SP2, SP3 along the third direction (X-axis direction) is greater than the pitch Pit12 of the first through third subpixels SP1, SP2, SP3 along the first direction (Z-axis direction), the pitch Pit21 of the condenser lenses 301 along the third direction (X-axis direction) may be greater than the pitch Pit22 of the condenser lenses 301 along the first direction (Z-axis direction). Alternatively, when the pitch Pit12 of the first through third subpixels SP1, SP2, SP3 along the first direction (Z-axis direction) is greater than the pitch Pit11 of the first through third subpixels SP1, SP2, SP3 along the third direction (X-axis direction), the pitch Pit22 of the condenser lenses 301 along the first direction (Z-axis direction) may be greater than the pitch Pit21 of the condenser lenses 301 along the third direction (X-axis direction). Alternatively, when the pitch Pit11 of the first through third subpixels SP1, SP2, SP3 along the third direction (X-axis direction) and the pitch Pit12 of the first through third subpixels SP1, SP2, SP3 along the first direction (Z-axis direction) are substantially equal to each other, the pitch Pit21 of the condenser lenses 301 along the third direction (X-axis direction) and the pitch Pit22 of the condenser lenses 301 along the first direction (Z-axis direction) may be substantially equal to each other.

When the first reflector 110 is at (or disposed at) the center of the lens 100, the condenser lenses 301 may be arranged symmetrically with respect to the center of the condenser lens array 300 as illustrated in FIGS. 3 and 4 to condense the image IM of the display device 200 onto the first reflector 110.

The first adhesive layer 400 bonds the lens 100 and the condenser lens array 300 together. The second adhesive layer 500 bonds the display device 200 and the condenser lens array 300 together. Each of the first and second adhesive layers 400 and 500 may be an optically clear resin (OCR) or an optically clear adhesive (OCA) film.

As described above, according to the optical device 10 illustrated in FIG. 1, a real image may be provided to a user's eye through the lens 100, and a virtual image output from the display device 200 may be provided to the user's eye through the first reflector 110. For example, one image in which the virtual image is superimposed on the real image can be provided to the user's eye.

In addition, according to the optical device 10 illustrated in FIG. 1, a virtual image output from the display device 200 is condensed by the condenser lens array 300 and then provided to the first reflector 110. Therefore, an area of the display device 200 visible to the user's eye, e.g., a field of view (FOV) of the user, can be increased.

Furthermore, according to the optical device 10 illustrated in FIG. 1, even when (or if) the lens 100 includes only one reflector 110, a virtual image output from the entire area of the display device 200 can be made visible to the user's eye by the condenser lens array 300. Therefore, the reflector 110 may interfere less with a real image that the user sees than when the lens 100 includes a plurality of reflectors 110.

When a micro display, such as an organic light emitting diode on silicon (OLEDoS) or a liquid crystal on silicon (LCOS) is used as the display device 200, a plurality of display devices 200 are required to expand the user's FOV. For example, an image displayed on the display devices 200 may look separated to the user due to the space between the display devices 200. In addition, because the display devices 200 are driven individually, they need to be synchronized, which makes it complicated to drive the display devices 200. Further, in the case of an OLEDoS, because a color filter is formed on an organic light emitting layer, which emits white light, to realize color, it is difficult to achieve high luminance.

On the other hand, in the optical device 10 illustrated in FIG. 1, because the image IM of the display device 200 is condensed on one reflector 110 by the condenser lens array 300, the user's FOV can be easily expanded, a virtual image does not look separated to the user, and there is no need to synchronize a plurality of display devices 200. In addition, when (or if) the display device 200 uses red, green and blue organic light emitting layers, it is advantageous in achieving high luminance compared with an OLEDoS because a color filter is not required.

Figure 5:
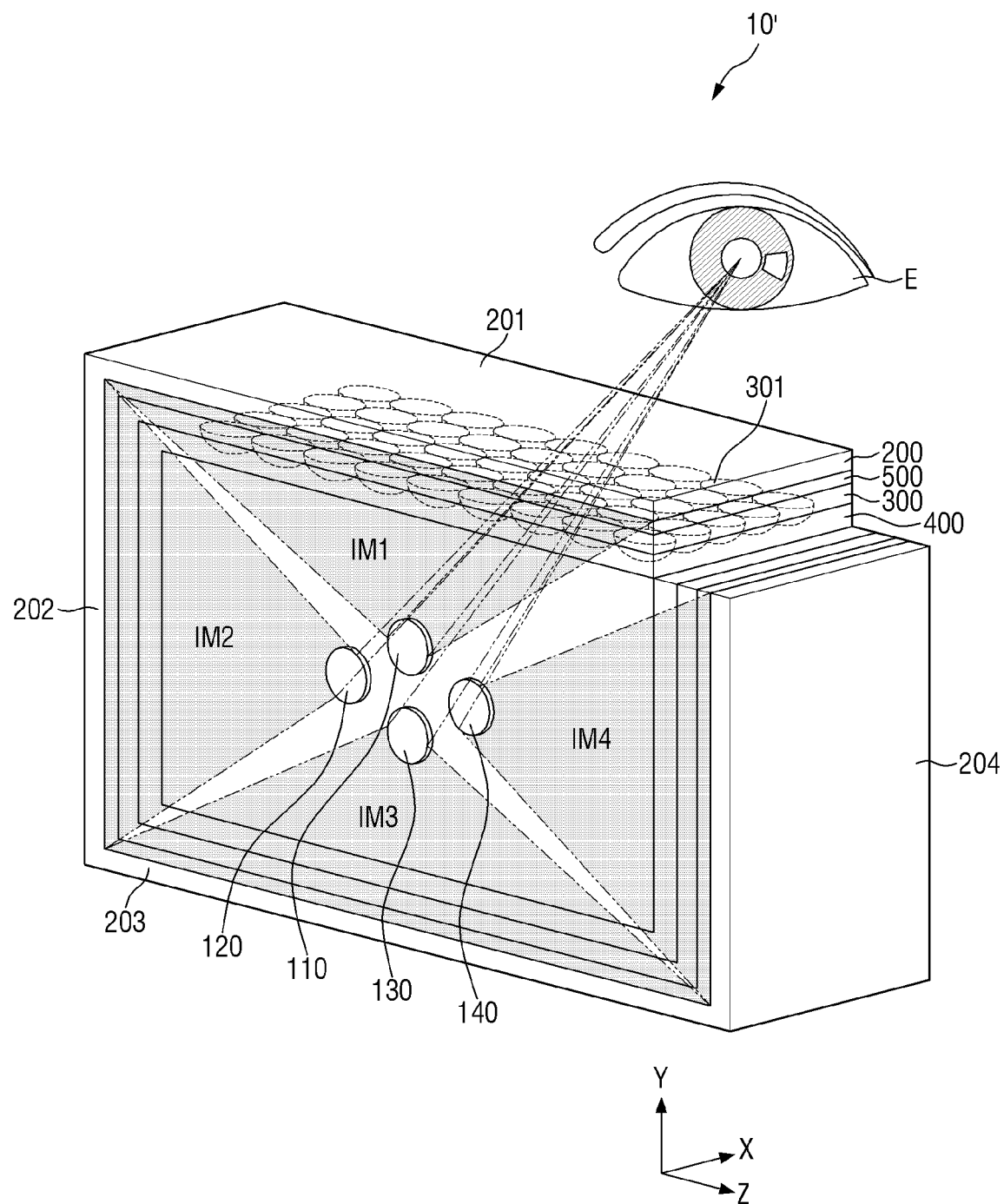
FIG. 5 is a perspective view of an optical device according to an embodiment.

FIG. 5 is a perspective view of an optical device 10' according to an embodiment.

The optical device 10' illustrated in FIG. 5 includes a lens 100, a display device 200, a condenser lens array 300, a first adhesive layer 400, and a second adhesive layer 500.

The embodiment of FIG. 5 is different from the embodiment of FIG. 1 in that the lens 100 includes a plurality of reflectors 110, 120, 130, 140, and the display device 200 and the condenser lens array 300 are at (e.g., on or disposed on) a plurality of side surfaces of the lens 100. In FIG. 5, a description of elements and features identical to those of the embodiment of FIG. 1 may be omitted.

Referring to FIG. 5, the lens 100 includes first through fourth reflectors 110, 120, 130, 140. Each of the first through fourth reflectors 110, 120, 130, 140 may also be referred to as a pin mirror.

The first through fourth reflectors 110, 120, 130, 140 may be at (e.g., near or disposed at the center of the lens 100, as illustrated in FIG. 5. The first through fourth reflectors 110, 120, 130, 140 reflect an image of the display device 200 condensed by the condenser lens array 300 onto a first surface SF1 (see corresponding reference numeral in FIG. 2) of the lens 100.

The first reflector 110 reflects a first image IM1 of a first display area 201 of the display device 200 condensed by the condenser lens array 300 onto the first surface SF1 of the lens 100. The second reflector 120 reflects a second image IM2 of a second display area 202 of the display device 200 condensed by the condenser lens array 300 onto the first surface SF1 of the lens 100. The third reflector 130 reflects a third image IM3 of a third display area 203 of the display device 200 condensed by the condenser lens array 300 onto the first surface SF1 of the lens 100. The fourth reflector 140 reflects a fourth image IM4 of a fourth display area 204 of the display device 200 condensed by the condenser lens array 300 onto the first surface SF1 of the lens 100.

The first reflector 110 reflects an image of the display device 200, which is condensed by the condenser lens array 300 in (or disposed in) the second direction (Y-axis direction), onto the first surface SF1 of the lens 100. Therefore, it may be inclined in a direction (−X-axis direction) opposite to the third direction (X-axis direction) with respect to the second direction (Y-axis direction). Also, the second reflector 120 reflects an image of the display device 200, which is condensed by the condenser lens array 300 in (or disposed in) a direction (−Z-axis direction) opposite the first direction (Z-axis direction), onto the first surface SF1 of the lens 100. Therefore, it may be inclined in a direction (−X-axis direction) opposite to the the third direction (X-axis direction) with respect to the direction (−Z-axis direction).

Further, the third reflector 130 reflects an image of the display device 200, which is condensed by the condenser lens array 300 in (or disposed in) a direction (−Y-axis direction) opposite to the second direction (Y-axis direction), onto the first surface SF1 of the lens 100. Therefore, it may be inclined in a direction (−X-axis direction) opposite to the third direction (X-axis direction) with respect to the direction (−Y-axis direction) opposite to the second direction (Y-axis direction). The fourth reflector 140 reflects an image of the display device 200, which is condensed by the condenser lens array 300 in (or disposed in) the first direction (Z-axis direction), onto the first surface SF1 of the lens 100. Therefore, it may be inclined in the direction (−X-axis direction) opposite to the third direction (X-axis direction) with respect to the second direction (Y-axis direction).

The tilted angle of each reflector may be predetermined (or determined experimentally in advance by a person skilled in the art) such that an image of the display device 200 is reflected from each reflector to a user's eye E placed on (e.g., at or near) the first surface SF1 of the lens 100.

Accordingly, the first through fourth reflectors 110, 120, 130, 140 can reflect an image of the display device 200 condensed by the condenser lens array 300 to the first surface SF1 of the lens 100, thereby providing the image to the user's eye E. For example, because an image displayed on the display device 200 is reflected by the first through fourth reflectors 110, 120, 130, 140, the depth of field is increased.

In addition, the first through fourth reflectors 110, 120, 130, 140 cause an image of the display device 200 condensed by the condenser lens array 300 to be focused at one point on the retina of the user's eye E. Therefore, even when (or if) the user focuses on a real image through the lens 100, he or she can clearly see a virtual image displayed on the display device 200. As such, even when (or if) the user does not shift his or her focus on the real image, he or she can clearly see the virtual image displayed on the display device 200.

The first reflector 110 and the third reflector 130 may be arranged adjacent to each other (e.g., side by side) along the second direction (Y-axis direction). In addition, the first reflector 110 and the third reflector 130 may be arranged symmetrically along the second direction (Y-axis direction) with respect to the center of the lens 100.

The second reflector 120 and the fourth reflector 140 may be arranged adjacent to each other (e.g., side by side) along the first direction (Z-axis direction). In addition, the second reflector 120 and the fourth reflector 140 may be arranged symmetrically along the first direction (Z-axis direction) with respect to the center of the lens 100.

The display device 200 can be bent due to its flexibility and may be on (or disposed on) first through fourth side surfaces SIF1, SIF2, SIF3, SIF4 of the lens 100 (see corresponding reference numerals in FIG. 2). The display device 200 may include the first display area 201 at (e.g, on or disposed on) the first side surface SIF1 of the lens 100, the second display area 202 at (e.g., on or disposed on) the second side surface SIF2 of the lens 100, the third display area 203 at (e.g., on or disposed on) the third side surface SIF3 of the lens 100, and the fourth display area 204 at (e.g., on or disposed on) the fourth side surface SIF4 of the lens 100.

The second display area 202 may extend from an end of the first display area 201, and the third display area 203 may extend from an end of the second display area 202. The fourth display area 204 may extend from an end of the third display area 203. For example, the display device 200 may surround the first through fourth side surfaces SIF1, SIF2, SIF3, SIF4 of the lens 100.

The condenser lens array 300 may be between (or disposed between) the lens 100 and the display device 200. For example, the condenser lens array 300 may be between (or disposed between) the first side surface SIF1 of the lens 100 and the first display area 201 of the display device 200, between the second side surface SIF2 of the lens 100 and the second display area 202 of the display device 200, between the third side surface SIF3 of the lens 100 and the third display area 203 of the display device 200, and between the fourth side surface SIF4 of the lens 100 and the fourth display area 204 of the display device 200.

In the embodiment illustrated in FIG. 5, the display device 200 and the condenser lens array 300 surround (or are disposed to surround) all side surfaces of the lens 100. However, the present disclosure is not limited thereto or thereby. For example, the display device 200 and the condenser lens array 300 may be at (e.g., on or disposed on) only some side surfaces of the lens 100, e.g., the first and second side surfaces SIF1 and SIF2 or the first through third side surfaces SIF1, SIF2, SIF3.

The condenser lens array 300 may include a plurality of condenser lenses 301. A plurality of the condenser lenses 301 between (or disposed between) the first side surface SIF1 of the lens 100 and the first display area 201 may be arranged to correspond (e.g., correspond one-to-one) to first through third subpixels SP1, SP2, SP3 (see corresponding reference numerals in FIG. 3) of the first display area 201. Accordingly, a number of the condenser lenses 301 between (or disposed between) the first side surface SIF1 of the lens 100 and the first display area 201 may be substantially equal to a number of the first through third subpixels SP1, SP2, SP3 of the first display area 201.

A plurality of the condenser lenses 301 between (or disposed between) the second side surface SIF2 of the lens 100 and the second display area 202 may be arranged to correspond (e.g., to correspond one-to-one) to first through third subpixels SP1, SP2, SP3 of the second display area 202. Accordingly, a number of the condenser lenses 301 between (or disposed between) the second side surface SIF2 of the lens 100 and the second display area 202 may be substantially equal to a number of the first through third subpixels SP1, SP2, SP3 of the second display area 202.

A plurality of the condenser lenses 301 between (or disposed between) the third side surface SIF3 of the lens 100 and the third display area 203 may be arranged to correspond (e.g., to correspond one-to-one) to first through third subpixels SP1, SP2, SP3 of the third display area 203. Accordingly, a number of the condenser lenses 301 between (or disposed between) the third side surface SIF3 of the lens 100 and the third display area 203 may be substantially equal to a number of the first through third subpixels SP1, SP2, SP3 of the third display area 203.

A plurality of the condenser lenses 301 between (or disposed between) the fourth side surface SIF4 of the lens 100 and the fourth display area 204 may be arranged to correspond (e.g., to correspond one-to-one) to first through third subpixels SP1, SP2, SP3 of the fourth display area 204. Accordingly, a number of the condenser lenses 301 between (or disposed between) the fourth side surface SIF4 of the lens 100 and the fourth display area 204 may be substantially equal to a number of the first through third subpixels SP1, SP2, SP3 of the fourth display area 204.

A pitch of the first through third subpixels SP1, SP2, SP3 and a pitch of the condenser lenses 301 in each of the first through fourth display areas 201, 202, 203, 204 may be substantially the same as those described above with reference to FIG. 1.

As described above, according to the embodiment illustrated in FIG. 5, a plurality of images input to a plurality of side surfaces can be provided to a user's eye through a plurality of reflectors, respectively. Therefore, even though one display is used, an area of the display device visible to the user's eye, that is, the FOV of the user can be increased.

Figure 6:
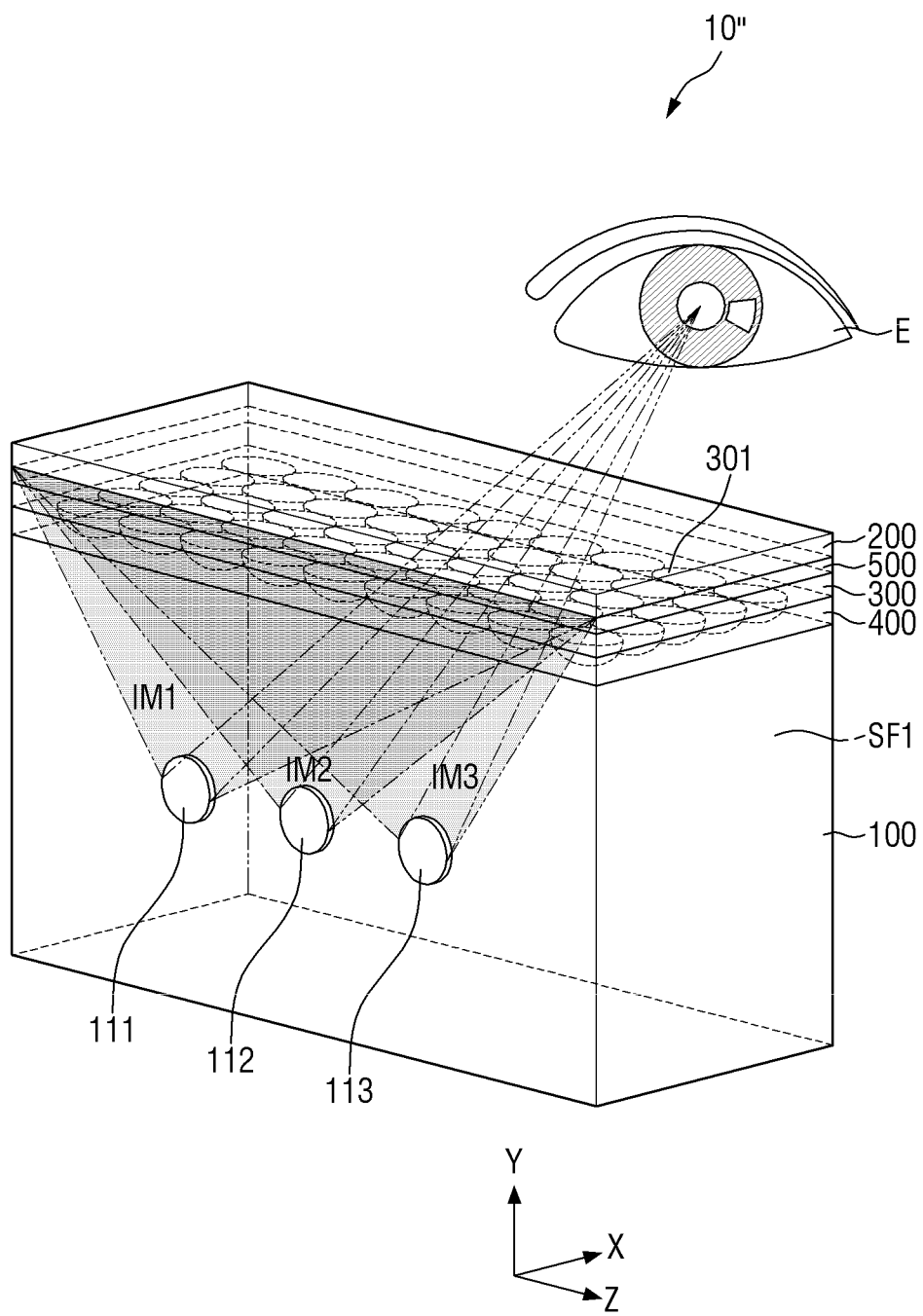
FIG. 6 is a perspective view of an optical device according to an embodiment.
Figure 7:
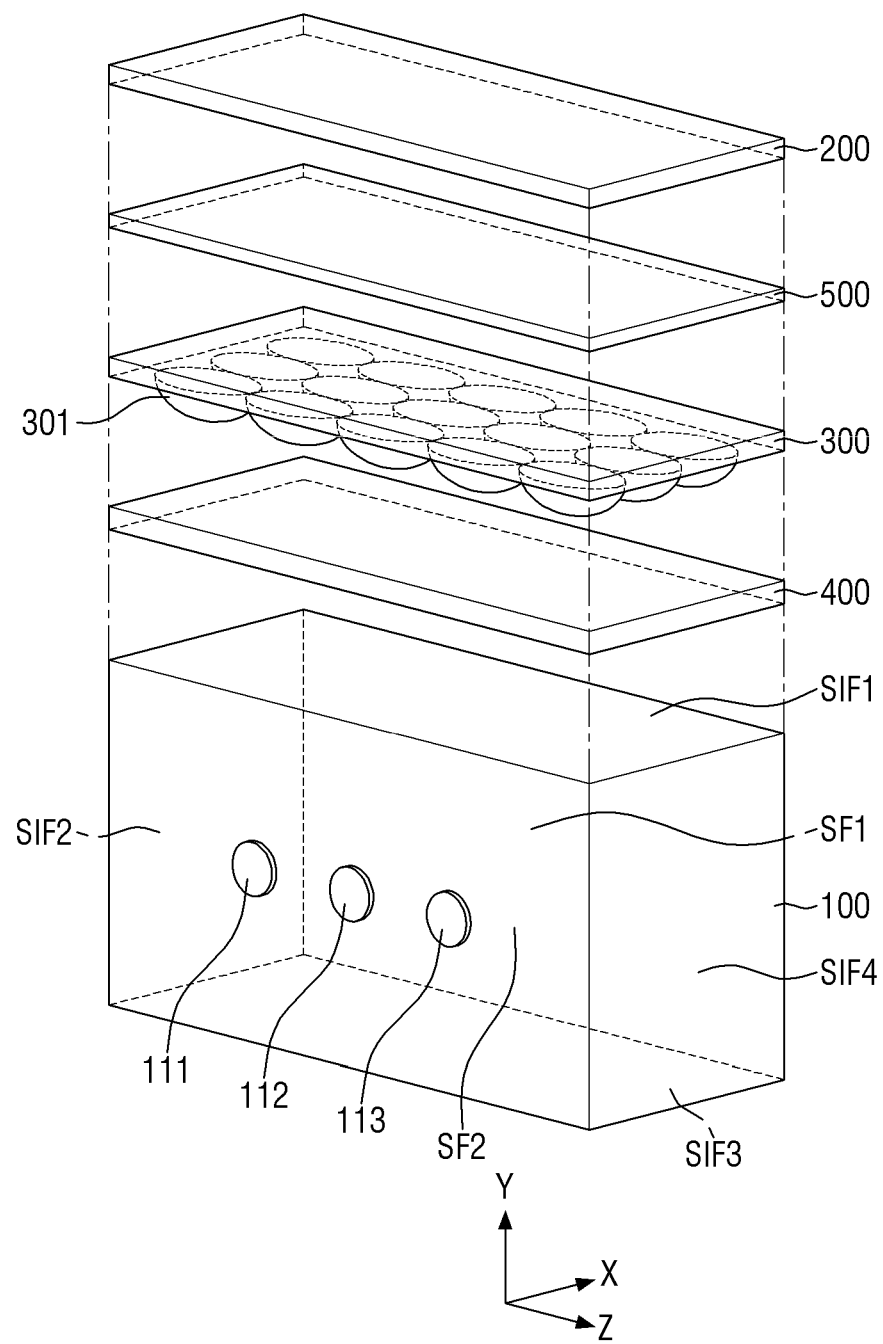
FIG. 7 is an exploded perspective view of the optical device of FIG. 6.

FIG. 6 is a perspective view of an optical device 10" according to an embodiment. FIG. 7 is an exploded perspective view of the optical device 10" of FIG. 6.

The optical device 10" illustrated in FIGS. 6 and 7 includes a lens 100, a display device 200, a condenser lens array 300, a first adhesive layer 400, and a second adhesive layer 500.

Figure 8A:
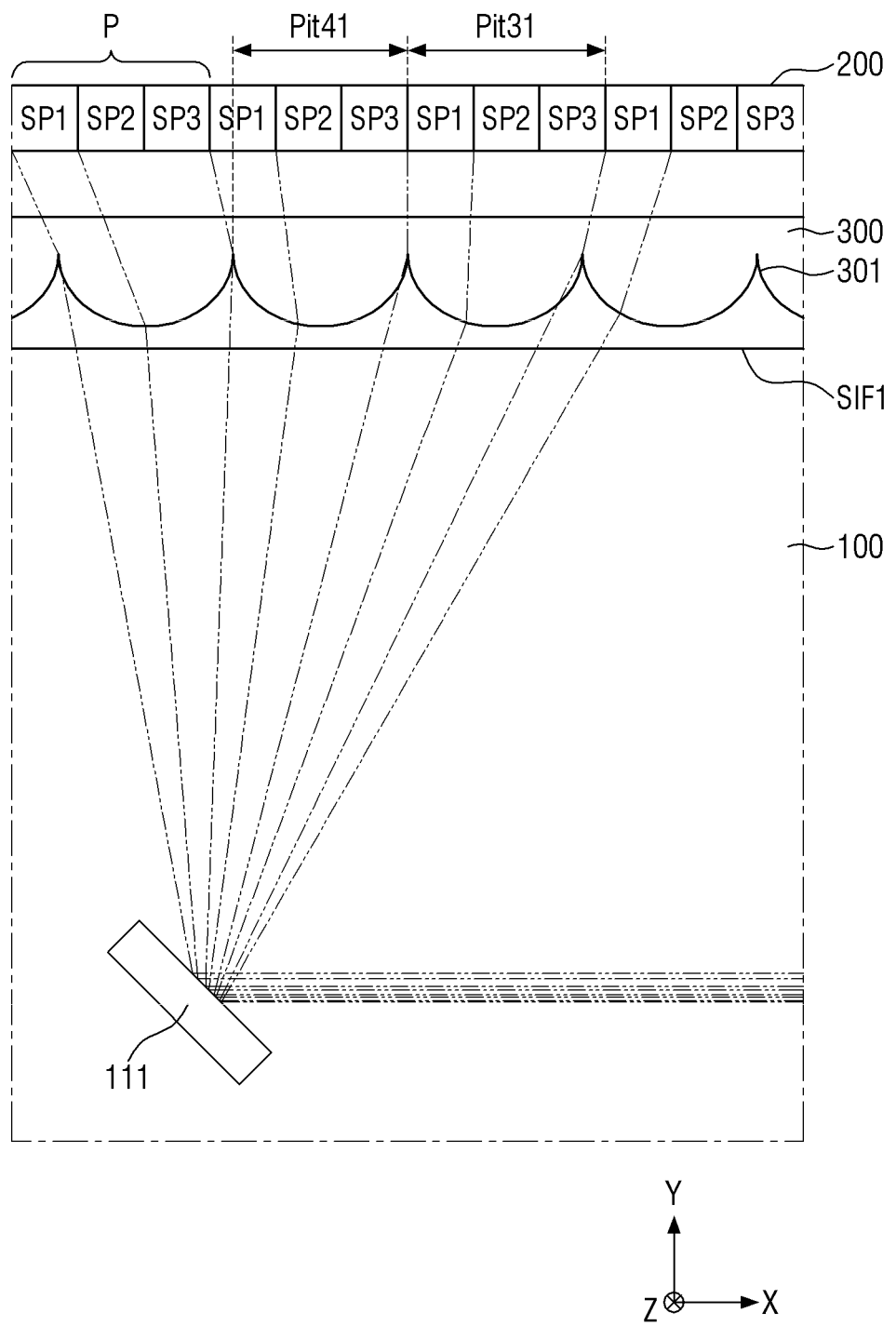
FIGS. 8A-8C are an example of subpixels of a display device, condenser lenses of a lens array, and reflectors of the optical device of FIG. 7 when viewed from the X-axis direction.
Figure 8B:
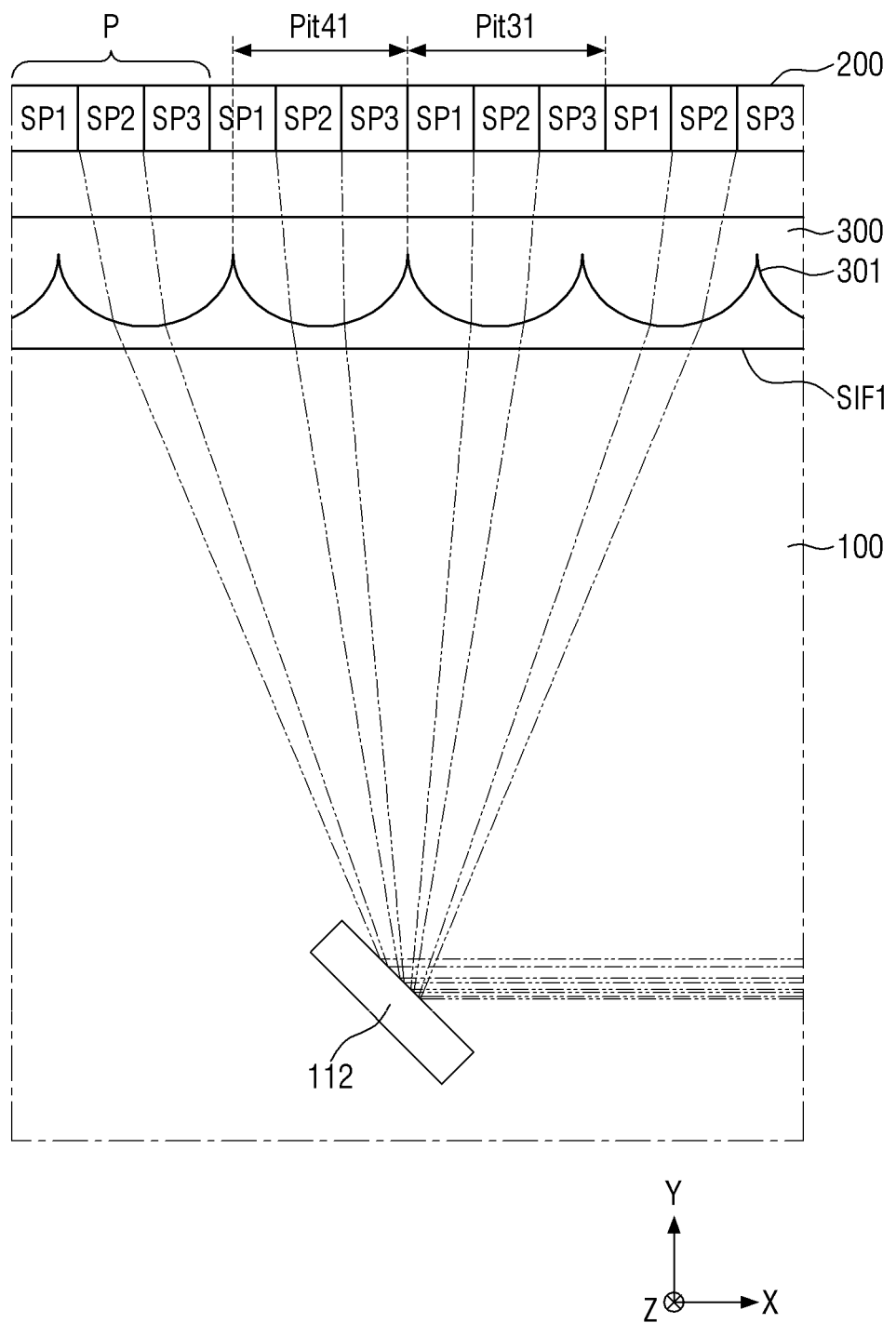
Figure 8C:
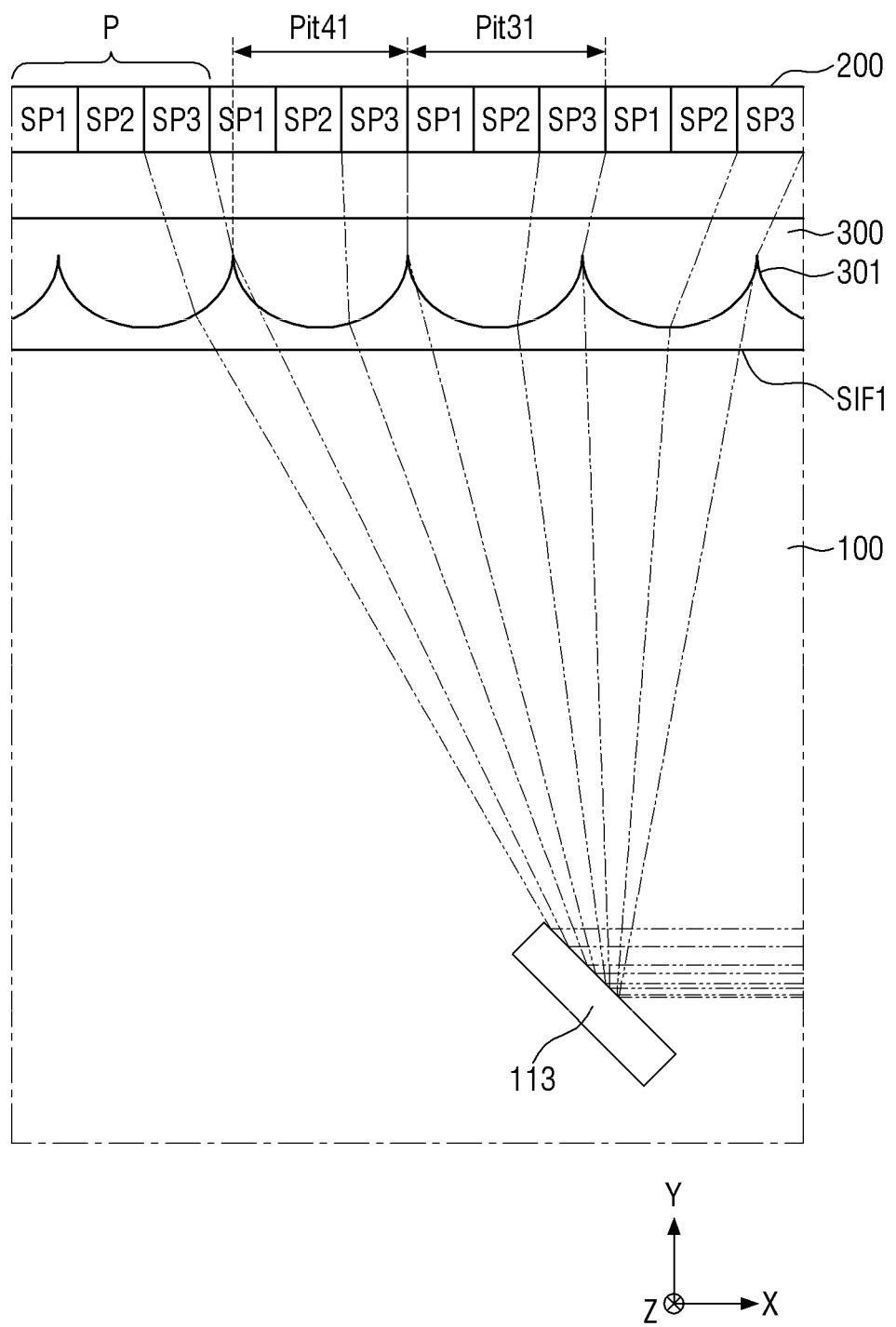

The embodiment of FIGS. 6 and 7 is different from the embodiment of FIG. 1 in that the lens 100 includes a plurality of reflectors 111, 112, 113, and a plurality of condenser lenses 301 are arranged to correspond one-to-one to a plurality of pixels P (see FIGS. 8A-8C). Additional description of elements and features identical to those described above may be omitted.

Referring to FIGS. 6 and 7, the optical device 10" includes $(1-1)^{th}$, $(1-2)^{th}$, and $(1-3)^{th}$ reflectors 111, 112, 113. Each of the $(1-1)^{th}$, $(1-2)^{th}$, and $(1-3)^{th}$ reflectors 111, 112, 113 may also be referred to as a pin mirror.

The $(1-1)^{th}$, $(1-2)^{th}$, and $(1-3)^{th}$ reflectors 111, 112, 113 may be at (e.g., on or disposed on) a center of the lens 100, as illustrated in FIGS. 6 and 7. The $(1-1)^{th}$, $(1-2)^{th}$, and $(1-3)^{th}$ reflectors 111, 112, 113 may be arranged side by side along the first direction (Z-axis direction), as illustrated in FIGS. 6 and 7. However, the present disclosure is not limited thereto or thereby. For example, the $(1-1)^{th}$ and $(1-3)^{th}$ reflectors 111 and 113 may be arranged side by side, and the $(1-2)^{th}$ reflector 112 may be closer (or disposed closer) to the center of the lens 100 than the $(1-1)^{th}$ and $(1-3)^{th}$ reflectors 111 and 113 (e.g., along the third direction or X-axis direction).

The $(1-1)^{th}$, $(1-2)^{th}$, and $(1-3)^{th}$ reflectors 111, 112, 113 reflect an image of the display device 200 condensed by the condenser lens array 300 to a first surface SF1 of the lens 100.

For example, the $(1-1)^{th}$ reflector 111 reflects light of first subpixels SP1 condensed by the condenser lens array 300 to the first surface SF1 of the lens 100. The $(1-2)^{th}$ reflector 112 reflects light of second subpixels SP2 condensed by the condenser lens array 300 to the first surface SF1 of the lens 100. The $(1-3)^{th}$ reflector 113 reflects light of third subpixels SP3 condensed by the condenser lens array 300 to the first surface SF1 of the lens 100.

In some embodiments, because each of the $(1-1)^{th}$, $(1-2)^{th}$, and $(1-3)^{th}$ reflectors 111, 112, 113 reflects an image of the display device 200, which is condensed by the condenser lens array 300 disposed in the second direction (Y-axis direction), to the first surface SF1 of the lens 100, it may be inclined in a direction (−X-axis direction) opposite to the third direction (X-axis direction) with respect to the second direction (Y-axis direction). In addition, the $(1-1)^{th}$ reflector 111 may be further out (or disposed further out) than the $(1-2)^{th}$ reflector 112 in a direction (−X-axis direction) opposite to the third direction (X-axis direction). Therefore, the $(1-1)^{th}$ reflector 111 may be inclined more than the $(1-2)^{th}$ reflector 112 in the direction (−Z-axis direction) opposite to the first direction (Z-axis direction) with respect to the direction (−X-axis direction) opposite to the third direction (X-axis direction). In addition, the $(1-3)^{th}$ reflector 113 is disposed further out than the $(1-2)^{th}$ reflector 112 in the third direction (X-axis direction). Therefore, the $(1-3)^{th}$ reflector 113 may be inclined more than the $(1-2)^{th}$ reflector 112 in the direction (−X-axis direction) opposite to the third direction (X-axis direction) with respect to the second direction (Y-axis direction). The tilted angle of each reflector may be predetermined or preselected (or determined experimentally in advance by a person skilled in the art) such that an image of the display device 200 is reflected from each of the $(1-1)^{th}$, $(1-2)^{th}$, and $(1-3)^{th}$ reflectors 111, 112, 113 to a user's eye E placed at (e.g., on or near) the first surface SF1 of the lens 100.

Accordingly, the $(1-1)^{th}$, $(1-2)^{th}$, and $(1-3)^{th}$ reflectors 111, 112, 113 can reflect an image of the display device 200 condensed by the condenser lens array 300 to the first surface SF1 of the lens 100, thereby providing the image to the user's eye E. For example, because an image displayed on the display device 200 is reflected by the $(1-1)^{th}$, $(1-2)^{th}$, and $(1-3)^{th}$ reflectors 111, 112, 113, the depth of field is increased.

In addition, the $(1-1)^{th}$, $(1-2)^{th}$, and $(1-3)^{th}$ reflectors 111, 112, 113 may cause an image of the display device 200 condensed by the condenser lens array 300 to be focused at one point on the retina of the user's eye E. Therefore, even when (or if) the user focuses on a real image through the lens 100, he or she can clearly see a virtual image displayed on the display device 200. For example, even when (or if) the user does not shift the focus on the real image, he or she can clearly see the virtual image displayed on the display device 200.

The condenser lens array 300 may be between (or disposed between) the lens 100 and the display device 200. The condenser lens array 300 may include a plurality of condenser lenses 301. Using the condenser lenses 301, the condenser lens array 300 may condense light of the first subpixels SP1 onto the $(1-1)^{th}$ reflector 111, light of the second subpixels SP2 onto the $(1-2)^{th}$ reflector 112, and light of the third subpixels SP3 onto the $(1-3)^{th}$ reflector 113.

In FIGS. 8A-8C and 9A-9C, each of the pixels P includes three subpixels SP1, SP2, SP3 arranged side by side in a striped pattern in the third direction (Z-axis direction). However, the present disclosure is not limited thereto or thereby. Each of the pixels P may also be formed in a diamond PENTILE® (PENTILE® is a registered trademark of Samsung Display Co., Ltd.) structure including four or more subpixels, for example.

The condenser lenses 301 may be formed as convex lenses that bulge toward the lens 100, as illustrated in FIGS. 8A-8C and 9A-9C, in order to condense light of the first through third subpixels SP1, SP2, SP3 onto the $(1-1)^{th}$, $(1-2)^{th}$, and $(1-3)^{th}$ reflectors 111, 112, 113. Alternatively, the condenser lenses 301 may be formed as Fresnel lenses to reduce the thickness of the condenser lens array 300.

The condenser lenses 301 may be arranged to correspond (or correspond one-to-one) to the pixels P, as illustrated in FIGS. 8A-8C and 9A-9C. Accordingly, a number of the condenser lenses 301 may be substantially equal to a number of the pixels P.

Figure 9A:
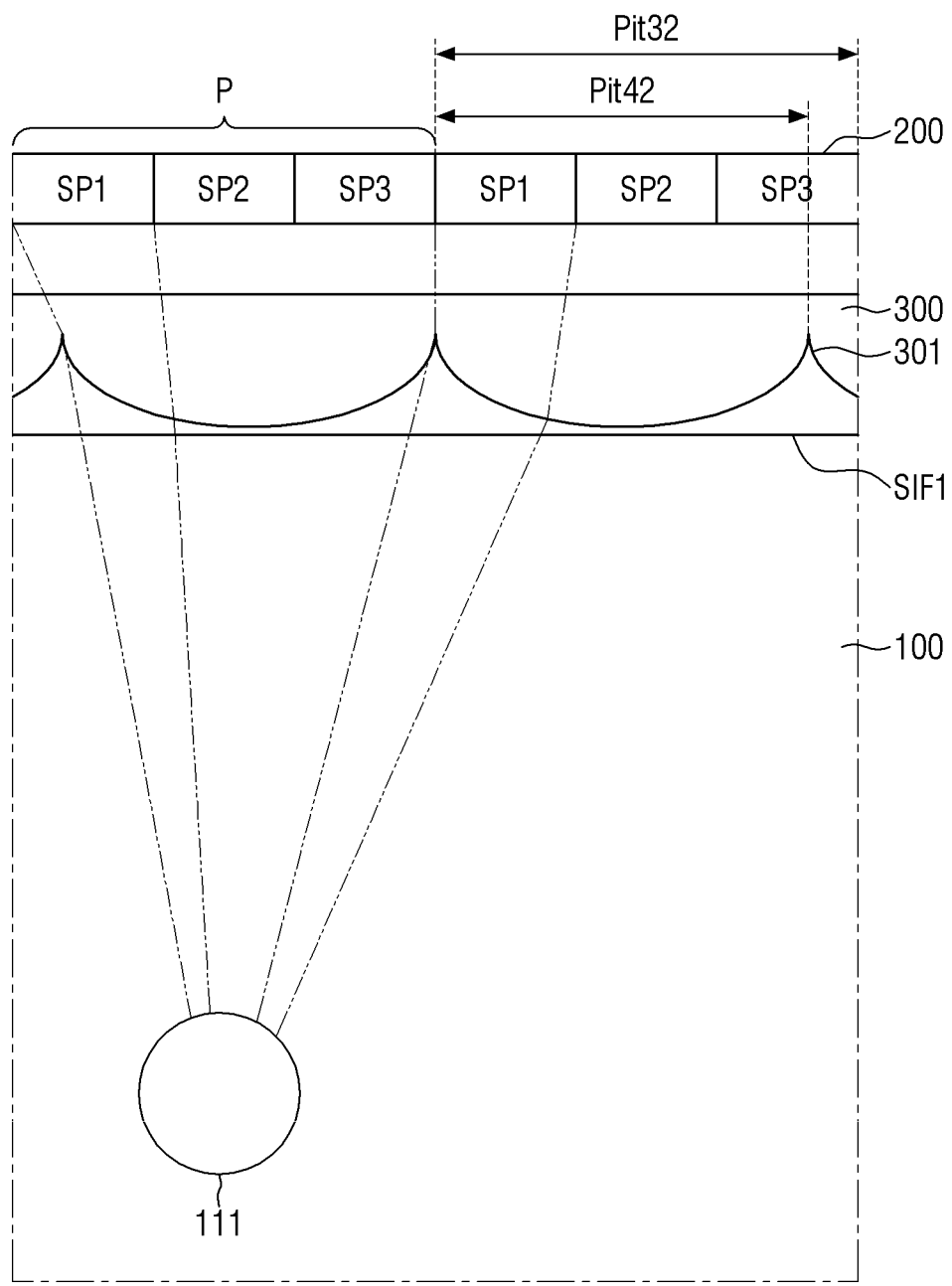
FIGS. 9A through 9C illustrate an example of the subpixels of the display device, the condenser lenses of the lens array, and the reflectors of the optical device of FIG. 7 when viewed from the Z-axis direction.
Figure 9B:
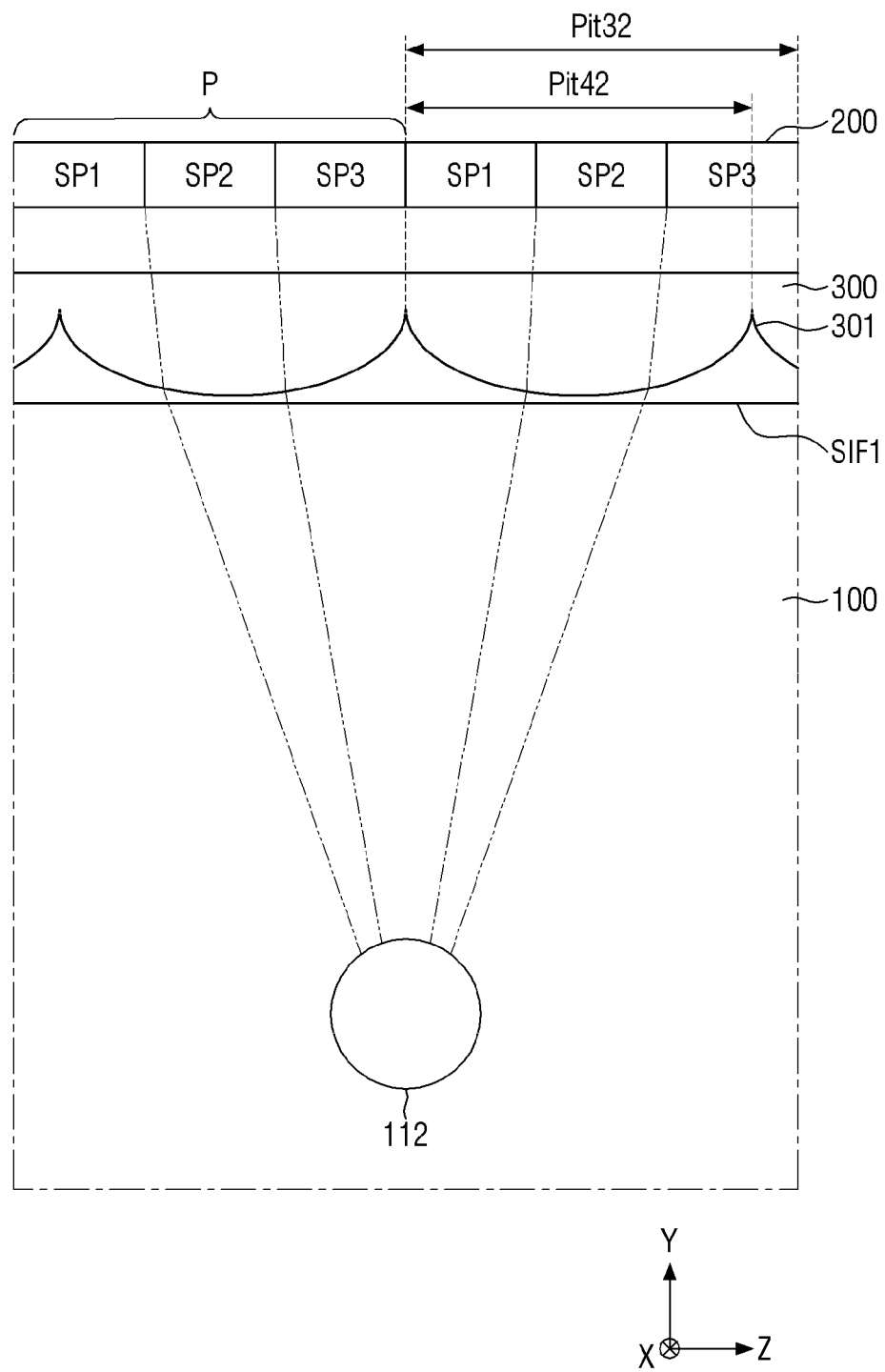
Figure 9C:
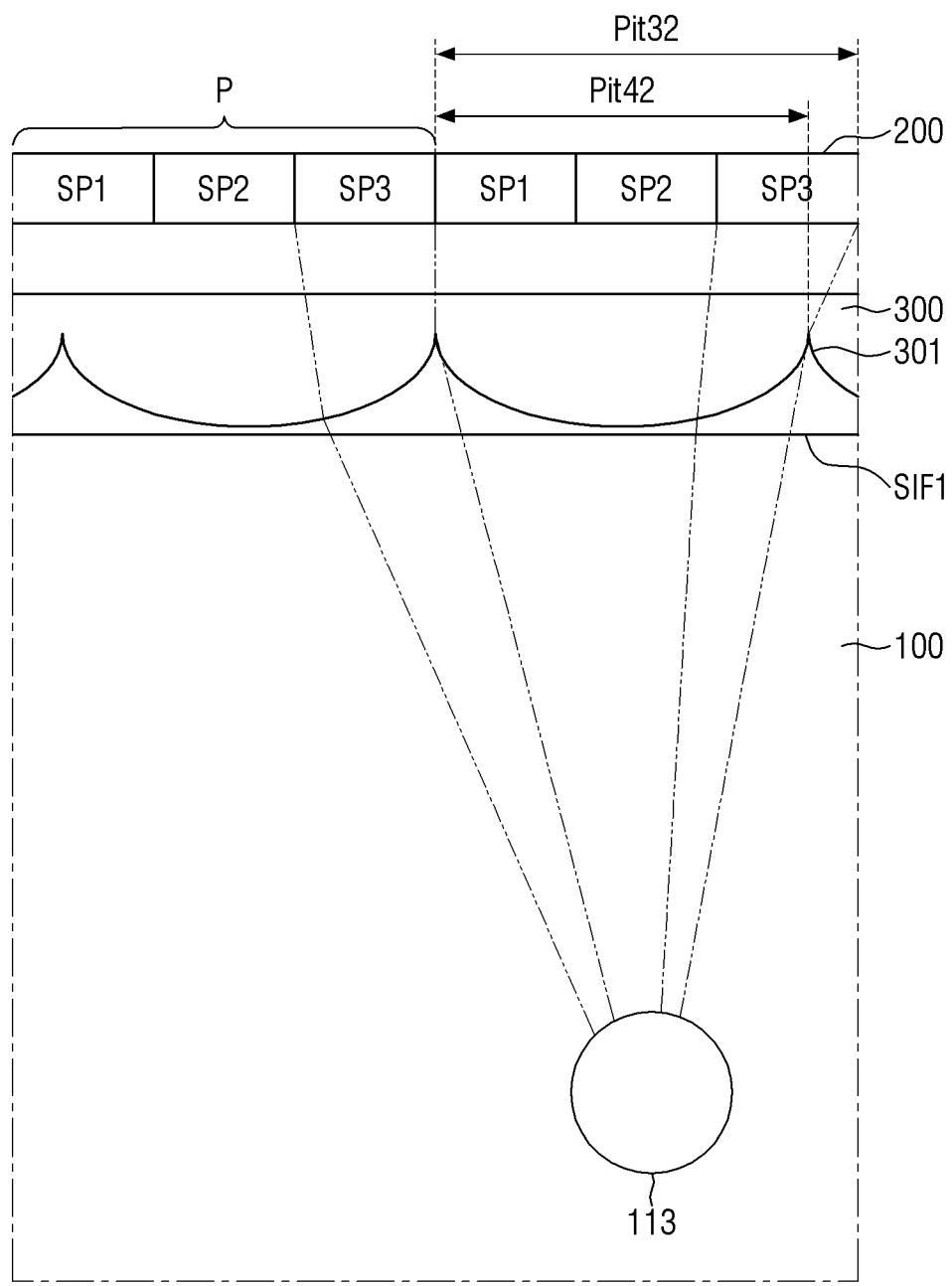

In order for the condenser lenses 301 to condense light of the first subpixels SP1 onto the $(1-1)^{th}$ reflector 111, light of the second subpixels SP2 onto the $(1-2)^{th}$ reflector 112 and light of the third subpixels SP3 onto the $(1-3)^{th}$ reflector 113, a pitch Pit31 of the pixels P along the third direction (X-axis direction) may be greater than a pitch Pit41 of the condenser lenses 301 along the third direction (X-axis direction), as illustrated in FIGS. 8A-8C, and a pitch Pit32 of the pixels P along the first direction (Z-axis direction) may be greater than a pitch Pit42 of the condenser lenses 301 along the first direction (Z-axis direction), as illustrated in FIGS. 9A-9C.

When the pitch Pit31 of the pixels P along the third direction is greater than the pitch Pit32 of the pixels P along the first direction, the pitch Pit41 of the condenser lenses 301 along the third direction may be greater than the pitch Pit42 of the condenser lenses 301 along the first direction. Alternatively, when the pitch Pit32 of the pixels P along the third direction is greater than the pitch Pit31 of the pixels P along the third direction, the pitch Pit42 of the condenser lenses 301 along the first direction may be greater than the pitch Pit41 of the condenser lenses 301 along the third direction. Alternatively, when the pitch Pit31 of the pixels P along the third direction and the pitch Pit32 of the pixels P along the first direction are substantially equal to each other, the pitch Pit41 of the condenser lenses 301 along the third direction and the pitch Pit42 of the condenser lenses 301 along the first direction may be substantially equal to each other.

When the $(1-1)^{th}$, $(1-2)^{th}$, and $(1-3)^{th}$ reflectors 111, 112, 113 are at (e.g., on or disposed on) the center of the lens 100, the condenser lenses 301 may be arranged symmetrically with respect to the center of the condenser lens array 300, as illustrated in FIGS. 8A-8C and 9A-9C, in order to condense an image of the display device 200 onto the $(1-1)^{th}$, $(1-2)^{th}$, and $(1-3)^{th}$ reflectors 111, 112, 113.

As described above, according to the embodiment illustrated in FIG. 6, a virtual image output from the display device 200 may be condensed by the condenser lens array 300 and then provided to the $(1-1)^{th}$, $(1-2)^{th}$, and $(1-3)^{th}$ reflectors 111, 112, 113. Therefore, an area of the display device 200 visible to the user's eye, e.g., the FOV of the user, can be increased.

Figure 15:
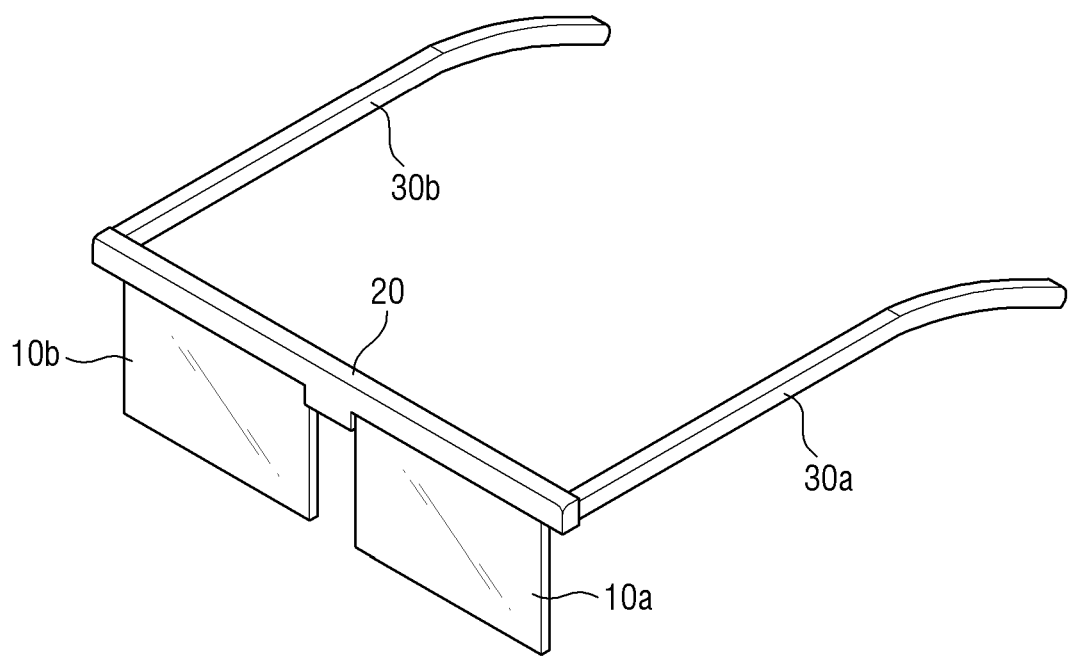
FIG. 15 illustrates an example head mounted display (HMD) including an optical device according to various embodiments.

The first through third subpixels SP1, SP2, SP3 of the display device 200 may concurrently (e.g., simultaneously) display first, second, and third view images. For example, the first subpixels SP1 may display the first view image, the second subpixels SP2 may display the second view image, and the third subpixels SP3 may display the third view image. The first through third view images may be multi-view images for realizing a stereoscopic image. For example, when (or if) a head mounted display (HMD) includes the optical device 10" of FIG. 6 (as illustrated in FIG. 15), the user may see the first through third view images through his or her left and right eyes. Therefore, the user can see a stereoscopic image. However, because the user sees all of the first through third view images through the left eye and the right eye, he or she may experience three-dimensional (3D) crosstalk, in which the first through third view images look superimposed on each other.

To solve or address this problem, some subpixels of the optical device 10" corresponding to the user's left eye may be used to display a view image, and the other subpixels of the optical device 10" corresponding to the user's right eye may be used to display another view image. Alternatively, the subpixels of the optical device 10" corresponding to the user's left eye and the subpixels of the optical device 10" corresponding to the user's right eye may be time-divisionally driven.

For example, the first subpixels SP1 of the optical device 10" corresponding to the user's left eye may display the first view image, and the second subpixels SP2 of the optical device 10" corresponding to the user's right eye may display the second view image or the third subpixels SP3 of the optical device 10" corresponding to the user's right eye may display the third view image. For example, because the user can see the first view image through the left eye and can see the second view image or the third view image through the right eye, he or she can be prevented from experiencing 3D crosstalk, or the likelihood thereof may be reduced.

Alternatively, the first subpixels SP1 of the optical device 10" corresponding to the user's left eye may display the first view image or the second subpixels SP2 of the optical device 10" corresponding to the user's left eye may display the second view image, and the third subpixels SP3 of the optical device 10" corresponding to the user's right eye may display the third view image. For example, because the user can see the first view image or the second view image through the left eye and can see the third view image through the right eye, he or she can be prevented from experiencing 3D crosstalk, or the likelihood thereof may be reduced.

Alternatively, the first subpixels SP1 of the optical device 10" corresponding to the user's left eye may display the first view image during a first period (e.g., during a first period of time), and the second subpixels SP2 may display the second view image during a second period (e.g., during a second period of time). In addition, the second subpixels SP2 of the optical device 10" corresponding to the user's right eye may display the second view image during the first period, and the third subpixels SP3 may display the third view image during the second period. Because the user sees the first view image through the left eye and the second view image through the right eye during the first period and sees the second view image through the left eye and the third view image through the right eye during the second period, he or she can be prevented from experiencing 3D crosstalk, or the likelihood thereof may be reduced.

Figure 10:
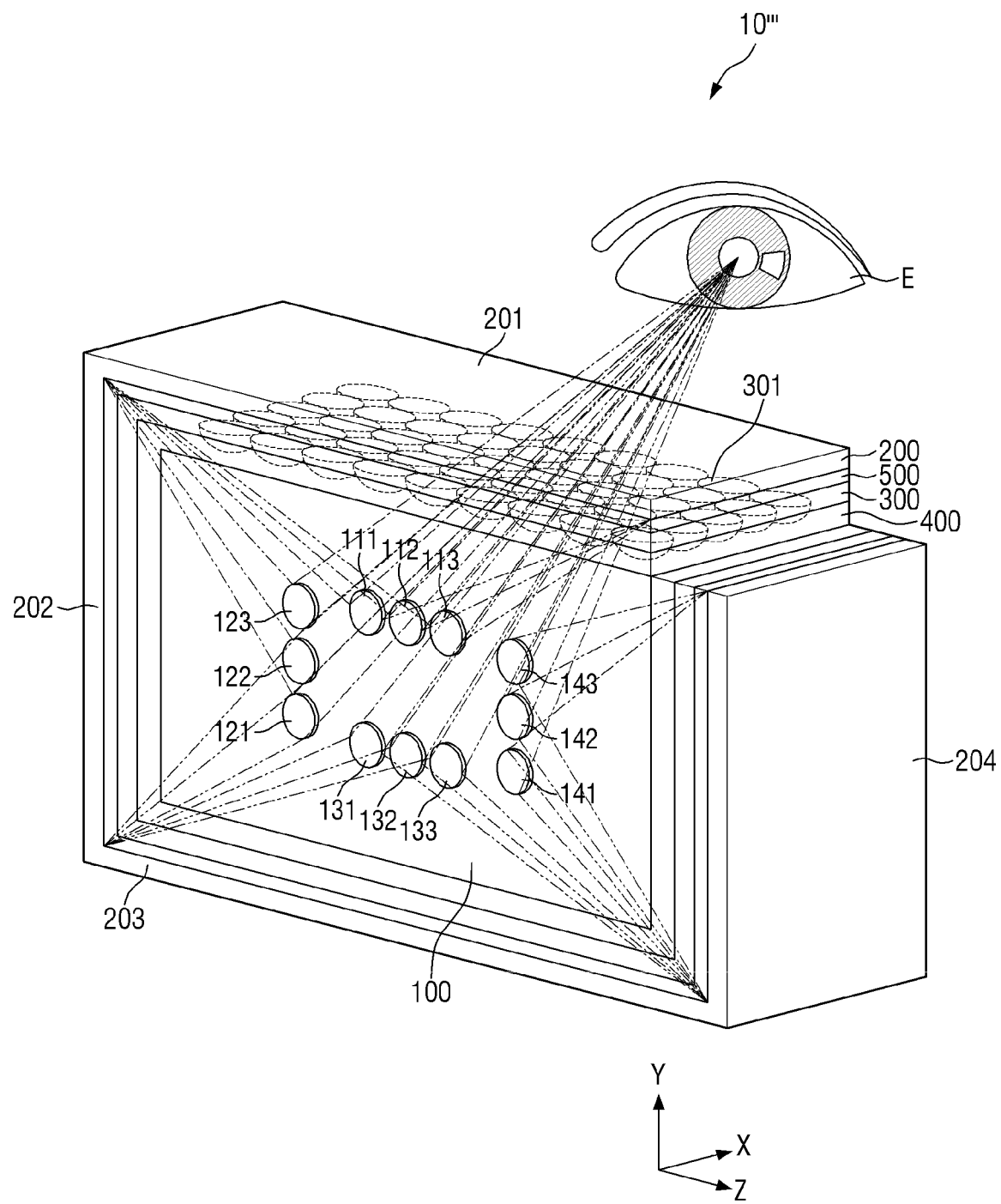
FIG. 10 is a perspective view of an optical device according to an embodiment.

FIG. 10 is a perspective view of an optical device 10''' according to an embodiment.

The optical device 10''' illustrated in FIG. 10 includes a lens 100, a display device 200, a condenser lens array 300, a first adhesive layer 400, and a second adhesive layer 500.

The embodiment of FIG. 10 is different from the embodiment of FIG. 6, for example, in that the lens 100 includes a plurality of reflectors corresponding to each side surface of the lens 100 as well as a first side surface thereof, and the display device 200 and the condenser lens array 300 are disposed on the side surfaces of the lens 100. Additional description of elements and features identical to those described above may be omitted.

Referring to FIG. 10, the lens 100 may include a plurality of reflectors corresponding to each side surface of the lens 100. For example, the lens 100 may include $(1\text{-}1)^{th}$, $(1\text{-}2)^{th}$, and $(1\text{-}3)^{th}$ reflectors 111, 112, 113 corresponding to the first side surface, $(2\text{-}1)^{th}$ $(2\text{-}2)^{th}$, and $(2\text{-}2)^{th}$ reflectors 121, 122, 123 corresponding to a second side surface, $(3\text{-}1)^{th}$, $(3\text{-}2)^{th}$, and $(3\text{-}2)^{th}$ reflectors 131, 132, 133 corresponding to a third side surface, and $(4\text{-}1)^{th}$, $(4\text{-}2)^{th}$, and $(4\text{-}2)^{th}$ reflectors 141, 142, 143 corresponding to a fourth side surface.

The reflectors may be disposed at (or near) the center of the lens 100, as illustrated in FIG. 10. The $(1\text{-}1)^{th}$, $(1\text{-}2)^{th}$, and $(1\text{-}3)^{th}$ reflectors 111, 112, 113 reflect an image of the display device 200 condensed by the condenser lens array 300 to a first surface SF1 (see FIG. 7) of the lens 100.

The $(1\text{-}1)^{th}$, $(1\text{-}2)^{th}$, and $(1\text{-}3)^{th}$ reflectors 111, 112, 113 are substantially the same as those described with reference to FIG. 6, and thus additional description thereof may be omitted in FIG. 10.

The $(2\text{-}1)^{th}$ reflector 121 reflects light of first subpixels SP1 (see FIG. 8A) of a second display area 202 condensed by the condenser lens array 300 to the first surface SF1 of the lens 100. The $(2\text{-}2)^{th}$ reflector 122 reflects light of second subpixels SP2 of the second display area 202 condensed by the condenser lens array 300 to the first surface SF1 of the lens 100. The $(2\text{-}3)^{th}$ reflector 123 reflects light of third subpixels SP3 of the second display area 202 condensed by the condenser lens array 300 to the first surface SF1 of the lens 100.

According to embodiments, because each of the $(2\text{-}1)^{th}$, $(2\text{-}2)^{th}$, and $(2\text{-}3)^{th}$ reflectors 121, 122, 123 reflects an image of the second display area 202, which is condensed by the condenser lens array 300 disposed in a direction (−Z-axis direction) opposite to the first direction (Z-axis direction), to the first surface SF1 of the lens 100, the $(2\text{-}1)^{th}$, $(2\text{-}2)^{th}$, and $(2\text{-}3)^{th}$ reflectors 121, 122, 123 may be inclined in a direction (−X-axis direction) opposite to the third direction (X-axis direction) with respect to the direction (−Z-axis direction) opposite to the first direction (Z-axis direction). In addition, the $(2\text{-}1)^{th}$ reflector 121 may be disposed further out than the $(2\text{-}2)^{th}$ reflector 122 in the second direction (Y-axis direction). Therefore, the $(2\text{-}1)^{th}$ reflector 121 may be inclined more than the $(2\text{-}2)^{th}$ reflector 122 in the direction (−Z-axis direction) opposite to the first direction (Z-axis direction) with respect to the second direction (Y-axis direction). In addition, the $(2\text{-}3)^{th}$ reflector 123 may be disposed further out than the $(2\text{-}2)^{th}$ reflector 122 in a direction (−Y-axis direction) opposite to the second direction (Y-axis direction). Therefore, the $(2\text{-}3)^{th}$ reflector 123 may be inclined more than the $(2\text{-}2)^{th}$ reflector 122 in the first direction (Z-axis direction) with respect to the second direction (Y-axis direction).

The $(3\text{-}1)^{th}$ reflector 131 reflects light of first subpixels SP1 of a third display area 203 condensed by the condenser lens array 300 to the first surface SF1 of the lens 100. The $(3\text{-}2)^{th}$ reflector 132 reflects light of second subpixels SP2 of the third display area 203 condensed by the condenser lens array 300 to the first surface SF1 of the lens 100. The $(3\text{-}3)^{th}$ reflector 133 reflects light of third subpixels SP3 of the third display area 203 condensed by the condenser lens array 300 to the first surface SF1 of the lens 100.

According to embodiments, because each of the $(3\text{-}1)^{th}$, $(3\text{-}2)^{th}$, and $(3\text{-}3)^{th}$ reflectors 131, 132, 133 reflects an image of the third display area 203, which is condensed by the condenser lens array 300 disposed in the direction (−Y-axis direction) opposite to the second direction (Y-axis direction), to the first surface SF1 of the lens 100, it may be inclined in the direction (−X-axis direction) opposite to the third direction (X-axis direction) with respect to the direction (−Y-axis direction) opposite to the second direction (Y-axis direction). In addition, the $(3\text{-}1)^{th}$ reflector 131 may be disposed further out than the $(3\text{-}2)^{th}$ reflector 132 in the direction (−Z-axis direction) opposite to the first direction (Z-axis direction). Therefore, the $(3\text{-}1)^{th}$ reflector 131 may be inclined more than the $(3\text{-}2)^{th}$ reflector 132 in the direction (−X-axis direction) opposite to the third direction (X-axis direction) with respect to the direction (−Z-axis direction) opposite to the first direction (Z-axis direction). In addition, the $(3\text{-}3)^{th}$ reflector 133 may be disposed further out than the $(3\text{-}2)^{th}$ reflector 132 in the first direction (Z-axis direction). Therefore, the $(3\text{-}3)^{th}$ reflector 133 may be inclined more than the $(3\text{-}2)^{th}$ reflector 132 in the direction (−X-axis direction) opposite to the third direction (X-axis direction) with respect to the first direction (Z-axis direction). The tilted angle of each reflector may be predetermined or preselected (or determined experimentally in advance by a person skilled in the art) such that an image of the display device 200 is reflected from each reflector to a user's eye E placed at (e.g., on or near) the first surface SF1 of the lens 100.

The $(4\text{-}1)^{th}$ reflector 141 reflects light of first subpixels SP1 of a fourth display area 204 condensed by the condenser lens array 300 to the first surface SF1 of the lens 100. The $(4\text{-}2)^{th}$ reflector 142 reflects light of second subpixels SP2 of the fourth display area 204 condensed by the condenser lens array 300 to the first surface SF1 of the lens 100. The $(4\text{-}3)^{th}$ reflector 143 reflects light of third subpixels SP3 of the fourth display area 204 condensed by the condenser lens array 300 to the first surface SF1 of the lens 100.

According to embodiments, because each of the $(4\text{-}1)^{th}$ $(4\text{-}2)^{th}$ and $(4\text{-}3)^{th}$ reflectors 141, 142, 143 reflects an image of the fourth display area 204, which is condensed by the condenser lens array 300 disposed in the first direction (Z-axis direction), to the first surface SF1 of the lens 100, it may be inclined in the direction (−X-axis direction) opposite to the third direction (X-axis direction) with respect to the first direction (Z-axis direction). In addition, the $(4\text{-}1)^{th}$ reflector 141 is further out (or disposed further out) than the $(4\text{-}2)^{th}$ reflector 142 in the second direction (Y-axis direction). Therefore, the $(4\text{-}1)^{th}$ reflector 141 may be inclined more than the $(4\text{-}2)^{th}$ reflector 142 in the direction (−Z-axis direction) opposite to the first direction (Z-axis direction) with respect to the second direction (Y-axis direction). In addition, the $(4\text{-}3)^{th}$ reflector 143 is further out (or disposed further out) than the $(4\text{-}2)^{th}$ reflector 142 in the direction (−Y-axis direction) opposite to the second direction (Y-axis direction). Therefore, the $(4\text{-}3)^{th}$ reflector 143 may be inclined more than the $(4\text{-}2)^{th}$ reflector 142 in the direction (−Z-axis direction) opposite to the first direction (Z-axis direction) with respect to the second direction (Y-axis direction).

The tilted angle of each reflector may be preselected or predetermined (or determined experimentally in advance by a person skilled in the art) such that an image of the display device 200 is reflected from each reflector to the user's eye E placed on the first surface SF1 of the lens 100.

Accordingly, because an image displayed on the display device 200 is reflected by the $(1\text{-}1)^{th}$ $(1\text{-}2)^{th}$ and $(1\text{-}3)^{th}$ reflectors 111, 112, 113, the $(2\text{-}1)^{th}$, $(2\text{-}2)^{th}$, and $(2\text{-}3)^{th}$ reflectors 121, 122, 123, the $(3\text{-}1)^{th}$ $(3\text{-}2)^{th}$ and $(3\text{-}3)^{th}$ reflectors 131, 132, 133, and the $(4\text{-}1)^{th}$ $(4\text{-}2)^{th}$ and $(4\text{-}3)^{th}$ reflectors 141, 142, 143, the depth of field is increased. In addition, the $(1\text{-}1)^{th}$ $(1\text{-}2)^{th}$ and $(1\text{-}3)^{th}$ reflectors 111, 112, 113, the $(2\text{-}1)^{th}$ $(2\text{-}2)^{th}$, and $(2\text{-}3)^{th}$ reflectors 121, 122, 123, $(3\text{-}1)^{th}$ $(3\text{-}2)^{th}$, and the $(3\text{-}3)^{th}$ reflectors 131, 132, 133 and $(4\text{-}1)^{th}$ $(4\text{-}2)^{th}$ and the $(4\text{-}3)^{th}$ reflectors 141, 142, 143 may cause an image of the display device 200 condensed by the condenser lens array 300 to be focused at one point on the retina of the user's eye E. Therefore, even when (or if) the user focuses on a real image through the lens 100, he or she can clearly (or more clearly) see a virtual image displayed on the display device 200. For example, even when (or if) the user does not shift the focus on the real image, he or she can clearly (or more clearly) see the virtual image displayed on the display device 200.

In FIG. 10, the display device 200 and the condenser lens array 300 are disposed on the first through fourth side surfaces of the lens 100. However, embodiments of the present disclosure is not limited thereto or thereby. For example, the display device 200 and the condenser lens array 300 may be disposed on two side surfaces or three side surfaces of the lens 100.

The condenser lens array 300 may include a plurality of condenser lenses 301. A plurality of condenser lenses 301 disposed between the first side surface of the lens 100 and a first display area 201 may correspond (or be arranged to correspond) one-to-one to pixels P of the first display area 201. Accordingly, a number of the condenser lenses 301 between (or disposed between) the first side surface of the lens 100 and the first display area 201 may be substantially equal to a number of the pixels P of the first display area 201.

A plurality of condenser lenses 301 between (or disposed between) the second side surface of the lens 100 and the second display area 202 may correspond (or be arranged to correspond) one-to-one to pixels P of the second display area 202. Accordingly, the number of the condenser lenses 301 between (or disposed between) the second side surface of the lens 100 and the second display area 202 may be substantially equal to the number of the pixels P of the second display area 202.

A plurality of condenser lenses 301 between (or disposed between) the third side surface of the lens 100 and the third display area 203 may be arranged to correspond one-to-one to pixels P of the third display area 203. Accordingly, the number of the condenser lenses 301 between (or disposed between) the third side surface of the lens 100 and the third display area 203 may be substantially equal to the number of the pixels P of the third display area 203.

A plurality of condenser lenses 301 between (or disposed between) the fourth side surface of the lens 100 and the fourth display area 204 may correspond (or be arranged to correspond) one-to-one to pixels P of the fourth display area 204. Accordingly, the number of the condenser lenses 301 between (or disposed between) the fourth side surface of the lens 100 and the fourth display area 204 may be substantially equal to the number of the pixels P of the fourth display area 204.

A pitch of the pixels P and a pitch of the condenser lenses 301 in each of the first through fourth display areas 201, 202, 203, 204 are substantially equal to those described above with reference to FIG. 6. As such, additional description thereof may be omitted.

As described above, according to the embodiment illustrated in FIG. 10, a plurality of images input to a plurality of side surfaces can be provided to a user's eye through a plurality of reflectors, respectively. Therefore, even though one display is used, an area of the display device visible to the user's eye, e.g., the FOV of the user, can be increased.

Figure 11:
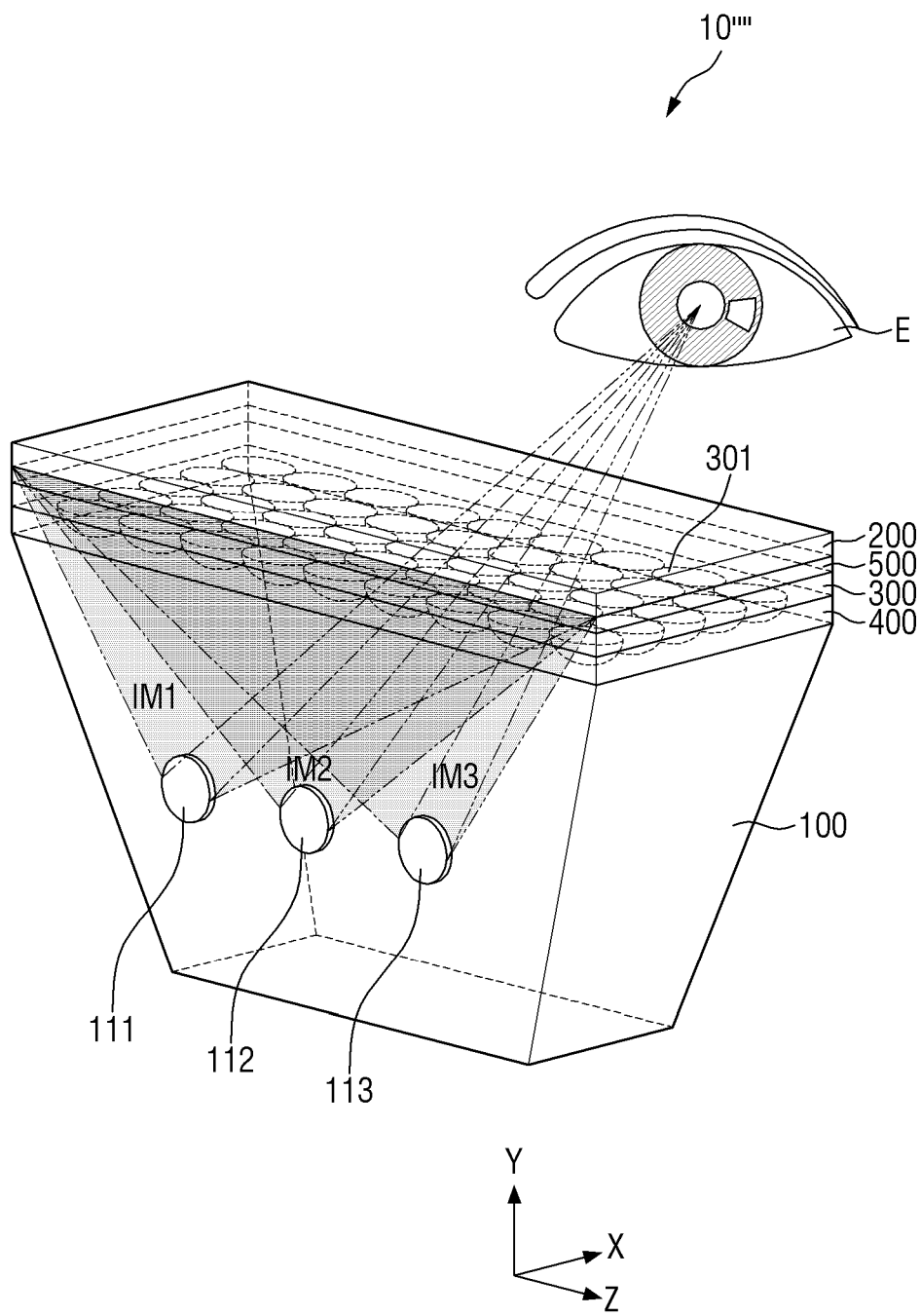
FIG. 11 is a perspective view of an optical device according to an embodiment.

FIG. 11 is a perspective view of an optical device 10'''' according to an embodiment.

The optical device 10'''' illustrated in FIG. 11 includes a lens 100, a display device 200, a condenser lens array 300, a first adhesive layer 400, and a second adhesive layer 500.

The embodiment of FIG. 11 is different from the embodiment of FIG. 6 in that the thickness of the lens 100 decreases from one side of the lens 100 toward the other side, and thus additional description of like elements may be omitted with reference to FIG. 11.

Figure 12A:
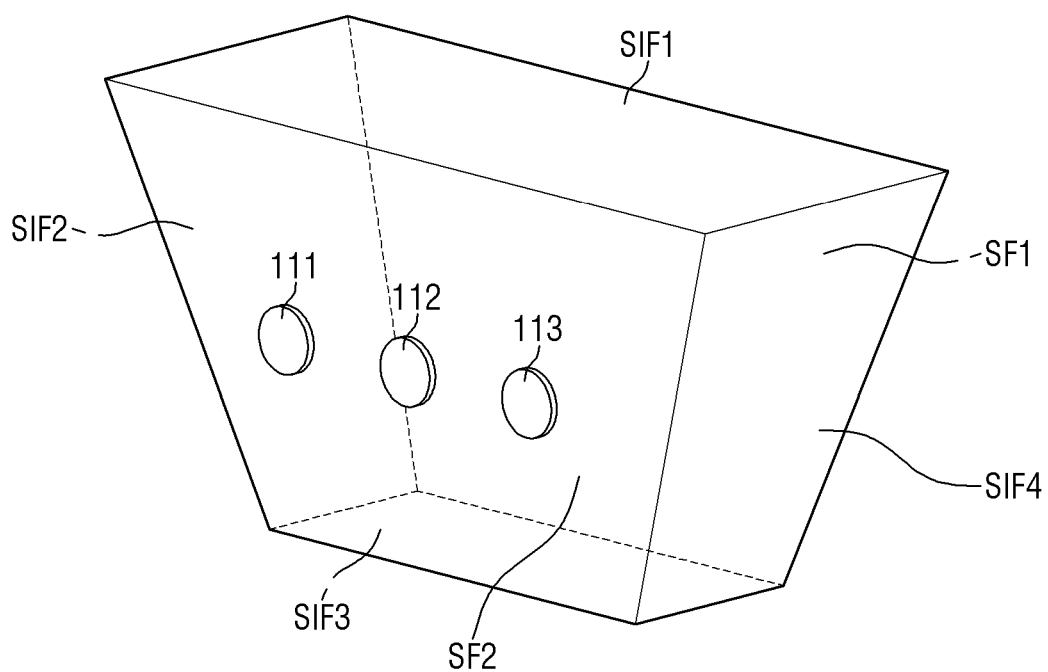
FIGS. 12A-12B are perspective views of a lens of the optical device of FIG. 11.

Referring to FIGS. 11 and 12A, the lens 100 may be formed in the shape of a hexahedron having quadrilateral first and second surfaces SF1 and SF2 and four side surfaces SIF1, SIF2, SIF3, SIF4. However, the shape of the lens 100 is not limited to the hexahedron, and the lens 100 may also be formed in various other suitable shapes.

According to the embodiment illustrated in FIG. 11, an image of the display device 200 is condensed by the condenser lens array 300 onto $(1\text{-}1)^{th}$, $(1\text{-}2)^{th}$, and $(1\text{-}3)^{th}$ reflectors 111, 112, 113. Therefore, when a width w3 (see FIG. 13) in which the $(1\text{-}1)^{th}$, $(1\text{-}2)^{th}$, and $(1\text{-}3)^{th}$ reflectors 111, 112, 113 of the lens 100 are arranged along the first direction (Z-axis direction) is minimized or reduced, the width of the lens 100 along the first direction (Z-axis direction) can be reduced.

Figure 13:
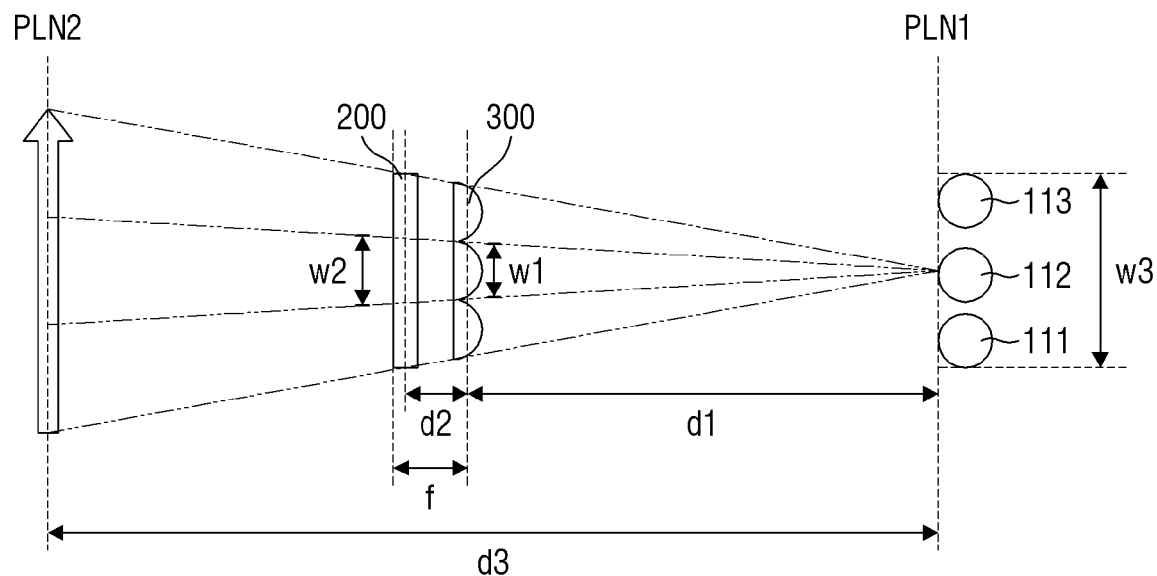
FIG. 13 is a schematic diagram of an example width in which reflectors of the optical device of FIG. 11 are arranged.

For example, as illustrated in FIG. 13, a width in which the $(1\text{-}1)^{th}$, $(1\text{-}2)^{th}$, and $(1\text{-}3)^{th}$ reflectors 111, 112, 113 are arranged along the first direction (Z-axis direction) may be defined as w3, a pitch of condenser lenses 301 may be defined as w1, a pitch of pixels P may be defined as w2, a distance from a plane PLN1 where the $(1\text{-}1)^{th}$, $(1\text{-}2)^{th}$, and $(1\text{-}3)^{th}$ reflectors 111 through 113 are arranged to the condenser lenses 301 (e.g., to a midline of the condenser lenses 301) may be defined as d1, a distance between the condenser lenses 301 (e.g., the midline of the condenser lenses 301) and subpixels SP1, SP2, SP3 may be defined as d2, and a distance from the plane PLN1 where the $(1\text{-}1)^{th}$, $(1\text{-}2)^{th}$, and $(1\text{-}3)^{th}$ reflectors 111, 112, 113 are arranged to a focal plane PLN2 of a virtual image may be defined as d3. In some embodiments, the width w3 in which the $(1\text{-}1)^{th}$, $(1\text{-}2)^{th}$, and $(1\text{-}3)^{th}$ reflectors 111, 112, 113 are arranged along the first direction (Z-axis direction) may be defined as in Equation (1).

$$w3 = \left(\frac{d3}{d3-d1}\right) \times w1 - \left(\frac{d1}{d2}\right) \times w2. \tag{1}$$

Because the width w3 in which the $(1\text{-}1)^{th}$, $(1\text{-}2)^{th}$, and $(1\text{-}3)^{th}$ reflectors 111, 112, 113 are arranged along the first direction (Z-axis direction) can be calculated as in Equation (1), one side of the lens 100 may be thinner than the other side. For example, as illustrated FIG. 12A, the thickness of the lens 100 may be reduced from one side toward the other side in consideration of the width w3 in which the $(1\text{-}1)^{th}$, $(1\text{-}2)^{th}$, and $(1\text{-}3)^{th}$ reflectors 111, 112, 113 are arranged along the first direction (Z-axis direction). Here, the one side may correspond to a side where the first side surface SIF1 is disposed, and the other side may correspond to a side where the third side surface SIF3 is disposed.

In addition, as illustrated in FIG. 12A, a size of the third side surface SIF3 may be smaller than a size of the first side surface SIF1. Accordingly, the first surface SF1, the second surface SF2, the second side surface SIF2, and the fourth side surface SIF4 may be inclined with respect to the second direction (Y-axis direction). However, embodiments of the present disclosure are not limited to the embodiment illustrated in FIG. 12A, and, for example, at least two of the first surface SF1, the second surface SF2, the second side surface SIF2 and the fourth side surface SIF4 may be inclined with respect to the second direction (Y-axis direction).

Therefore, because one side of the lens 100 may be formed thinner than the other side, as illustrated in FIG. 12A, the weight of the lens 100 may be reduced. This makes it possible to provide a lighter HMD to a user.

Figure 12B:
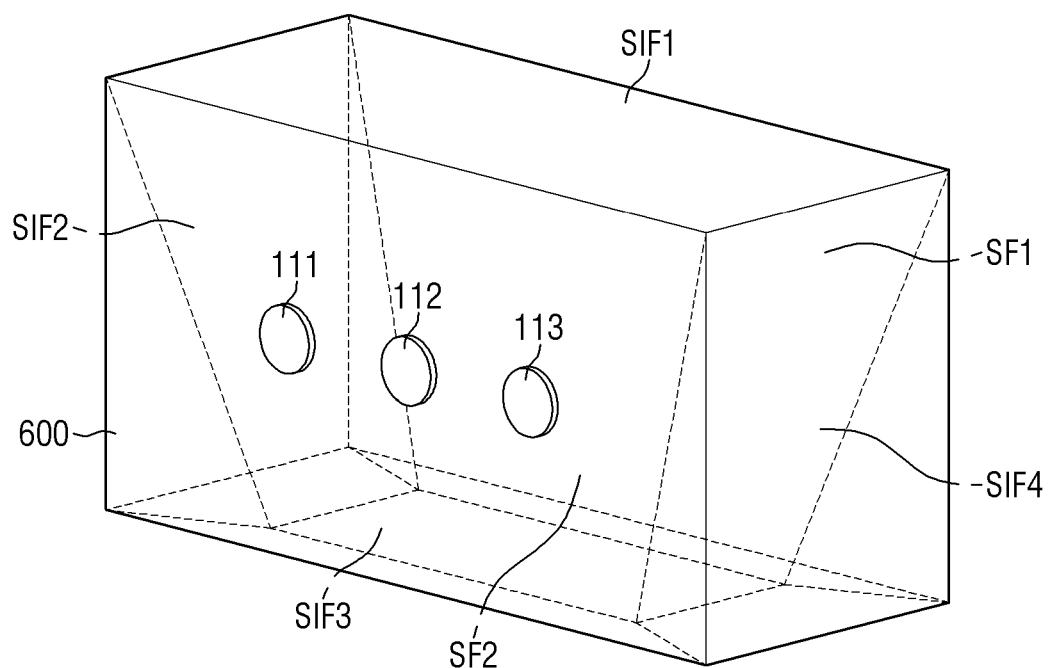

In addition, as illustrated in FIG. 12B, a resin 600 having a higher refractive index than the lens 100 may be formed on the first surface SF1, the second surface SF2, the second side surface SIF2, and the fourth side surface SIF4. However, embodiments of the present disclosure are not limited to the embodiment illustrated in FIG. 12B, and the resin 600 may be formed on a surface inclined with respect to the second direction (Y-axis direction) among the first surface SF1, the second surface SF2, the second side surface SIF2 and the fourth side surface SIF4, for example. One side of the resin 600 may be formed thicker than the other side. The resin 600 may become thicker from one side toward the other side, as illustrated in FIG. 12B. In some embodiments, the one side may correspond to a side where the first side surface SIF1 is disposed, and the other side may correspond to a side where the third side surface SIF3 is disposed. According to the embodiment illustrated in FIG. 12B, because the thickness of the lens 100 is reduced by the resin 600, distortion of a real image seen through the lens 100 can be reduced.

Figure 14:
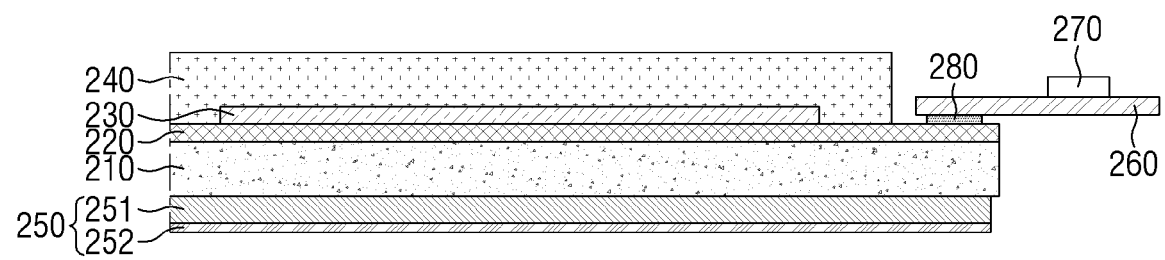
FIG. 14 is a cross-sectional view of a display device according to an embodiment.

FIG. 14 is a cross-sectional view of a display device 200 according to an embodiment.

In the example embodiment of FIG. 14, the display device 200 is shown as an organic light emitting display.

Referring to FIG. 14, the display device 200 according to the embodiment may include a support substrate 210, a flexible substrate 220, a pixel array layer 230, a barrier film 240, a heat dissipation film 250, a flexible film 260, a driver integrated circuit 270, and an anisotropic conductive film 280.

The support substrate 210 may be a substrate for supporting the flexible substrate 220 and may be made of plastic or glass. For example, the support substrate 210 may be made of polyethylene terephthalate (PET).

The flexible substrate 220 may be at (e.g., on or disposed on) an upper surface of the support substrate 210 and may be made of a plastic film having flexibility. For example, the flexible substrate 220 may be made of a polyimide film.

The pixel array layer 230 may be formed on (or at) an upper surface of the flexible substrate 220. The pixel array layer 230 is a layer in which a plurality of pixels are formed to display an image. The pixel array layer 230 may include a thin-film transistor layer, a light emitting element layer, and an encapsulation layer.

The thin-film transistor layer may include scan lines, data lines, and thin-film transistors. Each of the thin-film transistors includes a gate electrode, a semiconductor layer, and source and drain electrodes. When a scan driver is formed directly on the substrate, it may be formed together with the thin-film transistor layer.

The light emitting element layer may be disposed on the thin-film transistor layer. The light emitting element layer includes anodes, a light emitting layer, a cathode, and banks. The light emitting layer may include an organic light emitting layer containing an organic material. For example, the light emitting layer may include a hole injection layer, a hole transporting layer, an organic light emitting layer, an electron transporting layer, and an electron injection layer. According to embodiments, the hole injection layer and the electron injection layer may be omitted. When a voltage is applied to the anodes and the cathode, holes and electrons move to the organic light emitting layer through the hole transporting layer and the electron transporting layer, respectively, and combine together in the organic light emitting layer to emit light. The light emitting element layer may be a pixel array layer in which pixels are formed. Therefore, an area in which the light emitting element layer is formed may be defined as a display area for displaying an image. An area around the display area may be defined as a non-display area.

The encapsulation layer may be disposed on the light emitting element layer. The encapsulation layer serves to prevent penetration of oxygen or moisture into the light emitting element layer, or to reduce the likelihood thereof. The encapsulation layer may include at least one inorganic layer and at least one organic layer.

The barrier film 240 for encapsulating the flexible display device 200 to protect the flexible display device 200 from oxygen or moisture is disposed on the encapsulation layer.

The barrier film 240 may cover the pixel array layer 230 to protect the pixel array layer 230 from oxygen and moisture. That is, the barrier film 240 may be disposed on the pixel array layer 230.

The heat dissipation film 250 may be disposed on a lower surface of the support substrate 210. The heat dissipation film 250 may include a buffer member 251 serving as a buffer to protect the display device 200 from external impact and a metal layer 252 having a high thermal conductivity to effectively dissipate heat generated from the display device 200. The metal layer 252 may be copper (Cu), aluminum (Al), and/or aluminum nitride (AlN). When the heat dissipation film 250 includes the buffer member 251 and the metal layer 252, the buffer member 251 may be disposed on the lower surface of the support substrate 210, and the metal layer 252 may be disposed on a lower surface of the buffer member 251.

The flexible film 260 may be a chip on film (COF) on which the driver integrated circuit 270 is mounted. The driver integrated circuit 270 may be implemented as a chip for supplying driving signals to the data lines of the pixel array layer 230.

One side of the flexible film 260 may be attached onto the upper surface of the flexible substrate 220 using the anisotropic conductive film 280. For example, one side of the flexible film 260 may be attached onto pads provided on the upper surface of the flexible substrate 220 which is not covered by the barrier film 240. The pads provided on the upper surface of the flexible substrate 220 are connected to the data lines of the pixel array layer 230. Therefore, driving signals of the driver integrated circuit 270 can be supplied to the data lines of the pixel array layer 230 through the flexible film 260 and the pads.

FIG. 15 illustrates an example HMD including an optical device according to various embodiments.

FIG. 15 shows that an optical device can be applied to an HMD. An HMD according to an embodiment includes a first optical device 10a, a second optical device 10b, a support frame 20, and eyeglass temples 30a and 30b as illustrated in FIG. 15.

In FIG. 15, the HMD is implemented in the form of eyeglasses including the eyeglass temples 30a and 30b. However, a head mounted band that can be mounted on the head may also be provided instead of the eyeglass temples 30a and 30b.

An example in which an optical device is applied is not limited to that illustrated in FIG. 15, and the optical device can be applied in various forms to various other electronic devices.

According to an optical device according to an embodiment, a virtual image output from a display device is condensed by a condenser lens array and then provided to a reflector. Therefore, an area of the display device visible to a user's eye, e.g., the FOV of the user, can be increased.

In addition, according to an optical device according to an embodiment, even when (or if) a lens includes only one reflector, a virtual image output from the entire area of a display device can be made visible to a user's eye by a condenser lens array. Therefore, the reflector and a real image that the user sees may reflector interfere with each other less than when the lens includes a plurality of reflectors.

Also, according to an optical device according to an embodiment, a plurality of images input to a plurality of side surfaces can be provided to a user's eye through a plurality of reflectors, respectively. Therefore, an area of a display device visible to a user's eye, e.g., the FOV of the user, can be increased.

Furthermore, according to an optical device according to an embodiment, some subpixels of a display device may display a first view image, and the other subpixels may display a second view image. The first view image may be provided to a user's eye by a first reflector, and the second view image may be provided to the user's eye by a second reflector. Therefore, the user may be able to see a stereoscopic image.

However, while certain embodiments of the present invention have been illustrated and described, it is understood by those of ordinary skill in the art that certain modifications and changes can be made to the described embodiments without departing from the spirit and scope of the present invention as defined by the following claims, and equivalents thereof.

What is claimed is:

1. An optical device comprising:
   a lens comprising a first reflector which is inserted in a center portion of the lens;
   a display device at a first side surface of the lens and comprising a plurality of subpixels; and
   a lens array between the first reflector and the display device and comprising a plurality of lenses configured to condense light from the subpixels onto the first reflector,
   wherein a display image of the display device is incident to the first side surface of the lens and then the display image is output to a first surface of the lens by reflecting by the first reflector, and
   wherein a real image passes through a second surface and the first surface, the second surface of the lens facing the first surface of the lens.

2. The optical device of claim 1, wherein a pitch of the lenses in a first direction is smaller than a pitch of the subpixels in the first direction.

3. The optical device of claim 2, wherein the lenses are arranged to correspond one-to-one to the subpixels.

4. The optical device of claim 1, wherein the lens further comprises:
   a second reflector;
   a third reflector; and
   a fourth reflector, and
   wherein the display device comprises:
      a first display area at the first side surface of the lens;
      a second display area at a second side surface of the lens and extending from an end of the first display area;
      a third display area at a third side surface of the lens and extending from an end of the second display area; and
      a fourth display area at a fourth side surface of the lens and extending from an end of the third display area.

5. The optical device of claim 4, wherein the first reflector is configured to reflect a first image displayed on the first display area to a first surface of the lens, the second reflector is configured to reflect a second image displayed on the second display area to the first surface of the lens, the third reflector is configured to reflect a third image displayed on the third display area to the first surface of the lens, and the fourth reflector is configured to reflect a fourth image displayed on the fourth display area to the first surface of the lens.

6. The optical device of claim 1, wherein the display device surrounds side surfaces of the lens.

7. The optical device of claim 1, wherein a pitch of the lenses along a first direction is smaller than a pitch of a plurality of pixels along the first direction, and is greater than a pitch of the subpixels along the first direction,
   wherein each of the pixels comprises N subpixels, and
   wherein N is an integer of 2 or more.

8. The optical device of claim 7, wherein the lenses are arranged to correspond one-to-one to the pixels.

9. The optical device of claim 7, wherein the subpixels comprise first subpixels configured to display a first view image, second subpixels configured to display a second view image, and third subpixels configured to display a third view image.

10. The optical device of claim 7, wherein the first reflector comprises:
    a (1-1)-th reflector;
    a (1-2)-th reflector; and
    a (1-3)-th reflector,
    wherein the subpixels comprise:
       a first subpixel;
       a second subpixel; and
       a third subpixel, and
    wherein the lenses are configured to provide light of the first subpixels to the (1-1)-th reflector, light of the second subpixels to the (1-2)-th reflector and light of the third subpixels to the (1-3)-th reflector.

11. The optical device of claim 10, wherein the (1-1)-th reflector is configured to reflect the light of the first subpixels to a first surface of the lens, the (1-2)-th reflector is configured to reflect the light of the second subpixels to the first surface of the lens, and the (1-3)-th reflector is configured to reflect the light of the third subpixels to the first surface of the lens.

12. The optical device of claim 10, wherein the display device is at the first side surface of the lens and a second side surface of the lens, and
    wherein the lens further comprises:
       a (2-1)-th reflector configured to reflect the light of the first subpixels at the second side surface to a first surface of the lens;

a (2-2)-th reflector configured to reflect the light of the second subpixels at the second side surface to the first surface of the lens; and a (2-3)-th reflector configured to reflect the light of the third subpixels at the second side surface to the first surface of the lens.

13. The optical device of claim 12, wherein the display device is at a third side surface of the lens, and
wherein the lens comprises:
   a (3-1)-th reflector configured to reflect the light of the first subpixels at the third side surface to the first surface of the lens;
   a (3-2)-th reflector configured to reflect the light of the second subpixels at the third side surface to the first surface of the lens; and
   a (3-3)-th reflector configured to reflect the light of the third subpixels at the third side surface to the first surface of the lens.

14. The optical device of claim 13, wherein the display device is at a fourth side surface of the lens, and
wherein the lens comprises:
   a (4-1)-th reflector configured to reflect the light of the first subpixels at the fourth side surface to the first surface of the lens;
   a (4-2)-th reflector configured to reflect the light of the second subpixels at the fourth side surface to the first surface of the lens; and
   a (4-3)-th reflector configured to reflect the light of the third subpixels at the fourth side surface to the first surface of the lens.

15. The optical device of claim 1, wherein a first side of the lens is thinner than a second side of the lens.

16. The optical device of claim 15, wherein a thickness of the lens is reduced from the first side of the lens toward the second side of the lens.

17. The optical device of claim 15, wherein the lens further comprises a third side surface facing the first side surface, and
wherein the third side surface is smaller than the first side surface.

18. The optical device of claim 15, wherein the first surface is inclined with respect to a height direction of the lens.

19. The optical device of claim 18, further comprising a resin at the first surface of the lens and having a higher refractive index than the lens.

20. The optical device of claim 19, wherein a first side of the resin is thicker than a second side of the resin.

* * * * *